US011340120B2

(12) United States Patent
Matsumura et al.

(10) Patent No.: US 11,340,120 B2
(45) Date of Patent: May 24, 2022

(54) SENSOR MOUNTING STRUCTURE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-ken (JP)

(72) Inventors: Nobuyuki Matsumura, Mie (JP); Shinichi Takase, Mie (JP); Yusuke Suzuki, Aichi (JP); Atsushi Yamanaka, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 843 days.

(21) Appl. No.: 16/099,866

(22) PCT Filed: Apr. 26, 2017

(86) PCT No.: PCT/JP2017/016480
§ 371 (c)(1),
(2) Date: Nov. 8, 2018

(87) PCT Pub. No.: WO2017/195596
PCT Pub. Date: Nov. 16, 2017

(65) Prior Publication Data
US 2019/0113392 A1 Apr. 18, 2019

(30) Foreign Application Priority Data
May 12, 2016 (JP) .............................. JP2016-095950

(51) Int. Cl.
*G01K 1/14* (2021.01)
*H01M 50/543* (2021.01)
(Continued)

(52) U.S. Cl.
CPC ................. *G01K 1/14* (2013.01); *G01K 7/22* (2013.01); *H01M 10/486* (2013.01); *H01M 50/543* (2021.01)

(58) Field of Classification Search
CPC ............ G01K 1/14; G01K 7/22; G01K 1/146; G01K 1/08; H01M 2/30; H01M 10/486;
(Continued)

(56) References Cited

U.S. PATENT DOCUMENTS 10,230,219 B2   3/2019   Aoki
2014/0079094 A1 3/2014   Kim
(Continued)

FOREIGN PATENT DOCUMENTS

JP   2008-298662 A   12/2008
JP   2015-230200 A   12/2015
(Continued)

OTHER PUBLICATIONS

International Search Report issued in PCT/JP2017/016480, dated Jun. 20, 2017, along with an english translation thereof.
(Continued)

*Primary Examiner* — Lisa M Caputo
*Assistant Examiner* — Janice M Soto
(74) *Attorney, Agent, or Firm* — Greenblum & Bernstein, P.L.C.

(57) ABSTRACT

A sensor mounting structure includes an insulator and a temperature sensor. The insulator is attached to a wall of a case of an electric storage component to hold an electrode terminal projecting from the case and insulating the electrode terminal from the case. The temperature sensor
(Continued)

includes a temperature sensing portion, a locking portion, and a spring portion. The temperature sensing portion holds a temperature sensing component and includes a temperature sensing surface that contacts the wall of the case. The locking portion is locked to the insulator. The spring portion presses the temperature sensing portion to hold the temperature sensing surface in close contact with the wall of the case.

3 Claims, 23 Drawing Sheets

(51) Int. Cl.
*G01K 7/22* (2006.01)
*H01M 10/48* (2006.01)

(58) Field of Classification Search
CPC ............. H01M 2200/00; H01M 2/206; H01M 10/425; H01M 10/482; H01M 2/202; H01M 2/1077; H01M 8/04067; H01M 8/0432; Y02E 60/10
See application file for complete search history.

(56) References Cited

U.S. PATENT DOCUMENTS

| 2015/0056483 A1* | 2/2015 | Ogasawara | H01M 50/20 429/90 |
| 2015/0214583 A1* | 7/2015 | Lim | H01M 10/486 429/90 |
| 2017/0194771 A1 | 7/2017 | Aoki | |

FOREIGN PATENT DOCUMENTS

| JP | 5846903 B2 | 1/2016 |
| WO | 2015/181930 A1 | 12/2015 |
| WO | 2016/060265 A1 | 4/2016 |

OTHER PUBLICATIONS

Written Opinion issued in PCT/JP2017/016480, dated Jun. 20, 2017, along with an English translation thereof.

* cited by examiner

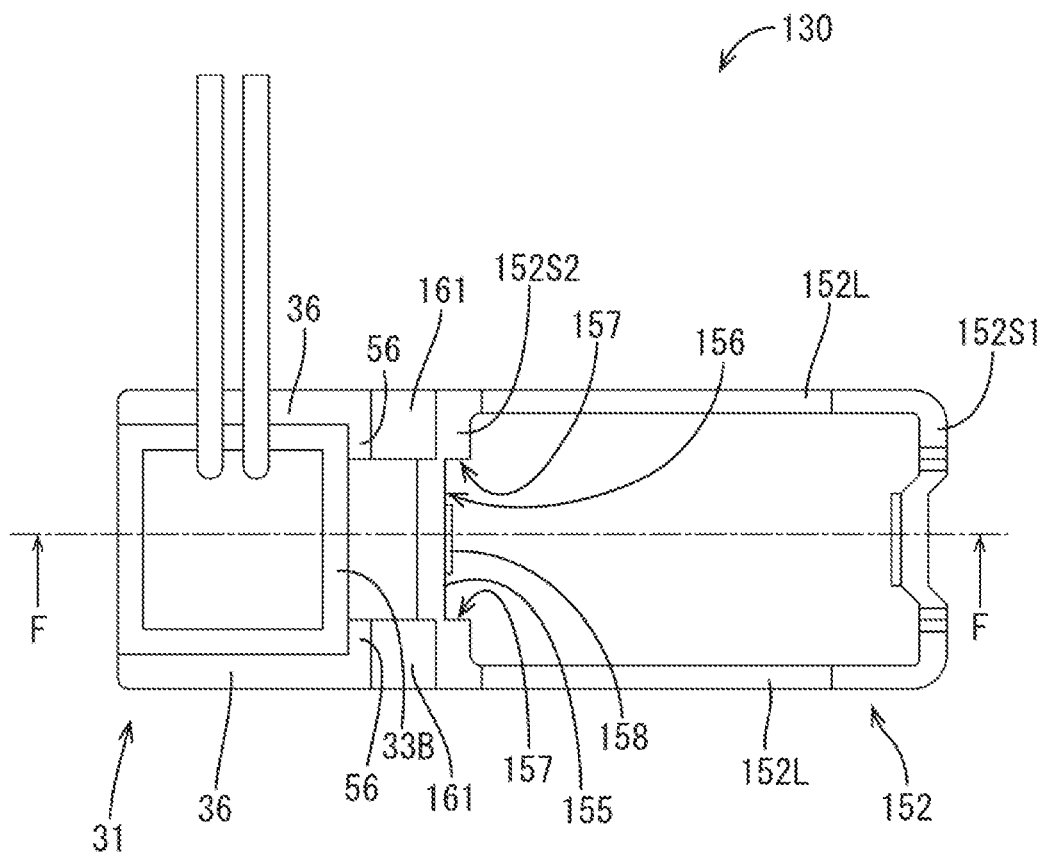
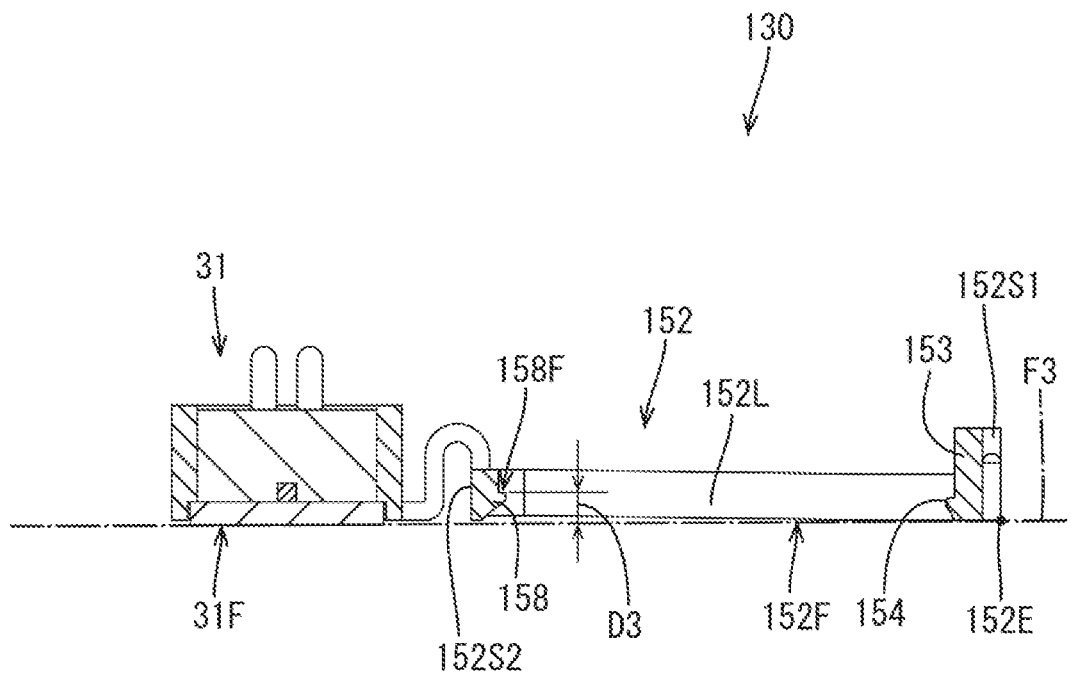

SENSOR MOUNTING STRUCTURE

TECHNICAL FIELD

The technology disclosed herein relates to a sensor mounting structure.

BACKGROUND ART

A battery module including battery cells disposed and connected to one another is used in a power supply device for an electric vehicle or a hybrid vehicle. Overheat of the battery cells in the battery module may reduce lifetime of the battery cells. Therefore, monitoring of temperatures of the battery cells is considered.

To monitor the temperature of each battery cell, a configuration of mounting a thermistor on a battery case is devised (see Patent Document 1). In the configuration, the thermistor is covered with a covering portion that is made of synthetic resin, a locking portion is provided on sides of the covering portion via flexible portions, and the locking portions are coupled with a baseplate on the battery cell. The thermistor mounted on the battery case is in close contact with an upper surface of the battery case with a force applied by the flexible portions.

CITATION LIST

Patent Document

Patent Document 1: Japanese Unexamined Patent Application Publication No. 2008-298662A According to the configuration described above, an overall sensor mounting structure is complicated because of the baseplate.

Furthermore, the battery and the baseplate have separate size tolerances and thus a displacement may occur between the battery and the thermistor. If such a displacement occurs, the thermistor may be lifted from the battery case or angled relative to the battery case. This may cause a reduction in accuracy of the temperature measurement. To avoid the reduction in accuracy of the temperature measurement, a spring stroke of the flexible portions need to be increased. Therefore, the mounting structure is complicated.

SUMMARY

A sensor mounting structure includes an insulator and a temperature sensor. The insulator is attached to a wall of a case of an electric storage component to hold an electrode terminal projecting from the case and insulating the electrode terminal from the case. The temperature sensor includes a temperature sensing portion, a locking portion, and a spring portion. The temperature sensing portion holds a temperature sensing component and includes a temperature sensing surface that contacts the wall of the case. The locking portion is locked to the insulator. The spring portion presses the temperature sensing portion to hold the temperature sensing surface in close contact with the wall of the case.

According to the configuration, the locking portion of the temperature sensor is locked to the insulating member attached to the wall of the case of the electric storage component. In comparison to the conventional mounting structure of mounting the thermistor on the battery via the baseplate, the overall sensor mounting structure can be simplified because the baseplate is not used.

According to the technology described herein, a sensor mounting structure that is simplified and able to obtain proper accuracy of temperature measurement is provided.

BRIEF DESCRIPTION OF DRAWINGS

FIG. 24 is a plan view of the temperature sensor in the second embodiment.

FIG. 25 is a cross-sectional view along line F-F in FIG. 24.

DESCRIPTION OF EMBODIMENTS

First Embodiment

A first embodiment will be described with reference to FIGS. 1 to 12. A sensor mounting structure according to the first embodiment is a structure of mounting a temperature sensor 30 on a battery case 11 (corresponding to a case) of a battery cell 10 (corresponding to an electric storage component).

Figure 1:
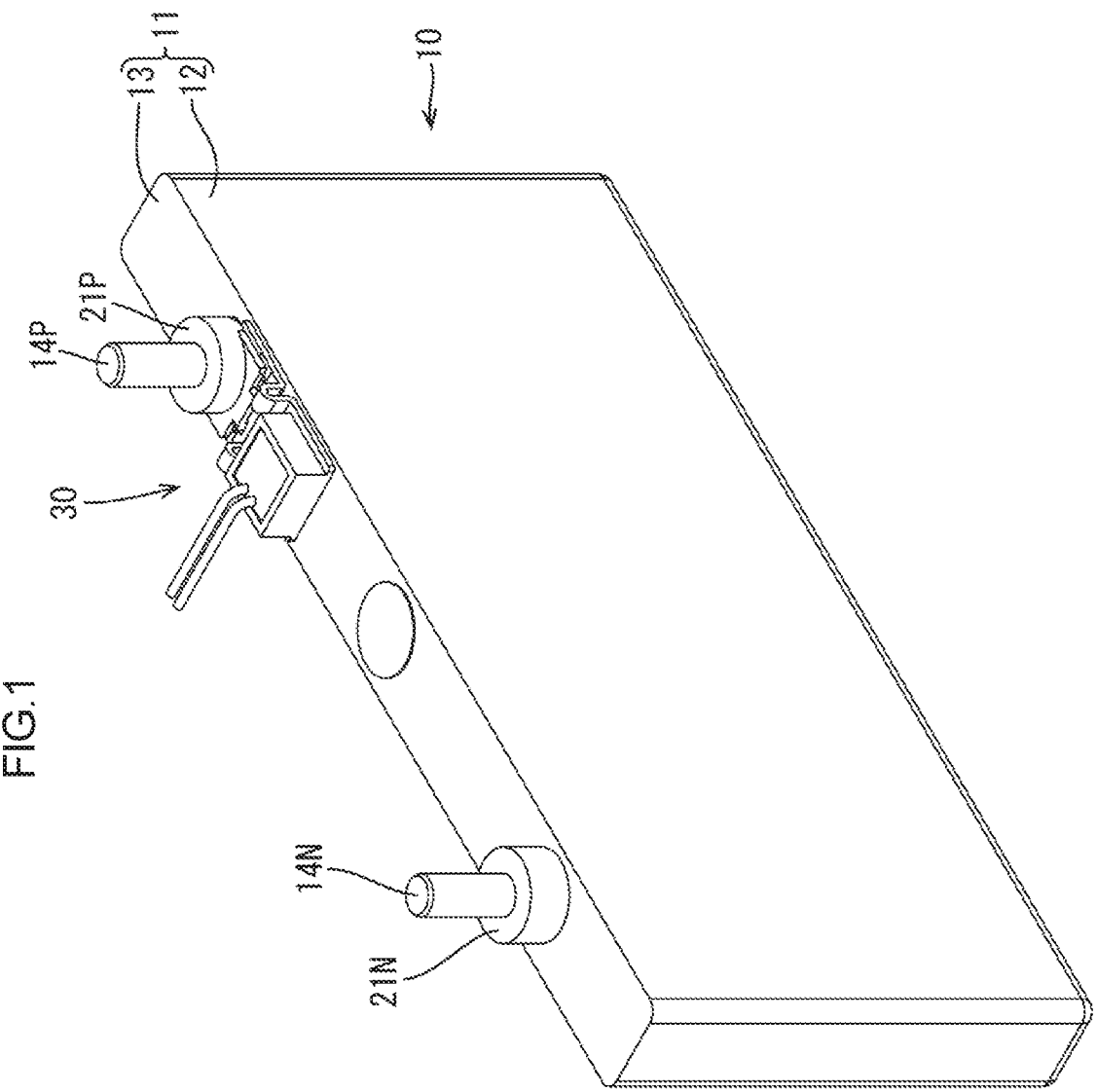
FIG. 1 is a perspective view of a battery cell with a temperature sensor mounted according to a first embodiment.
Figure 2:
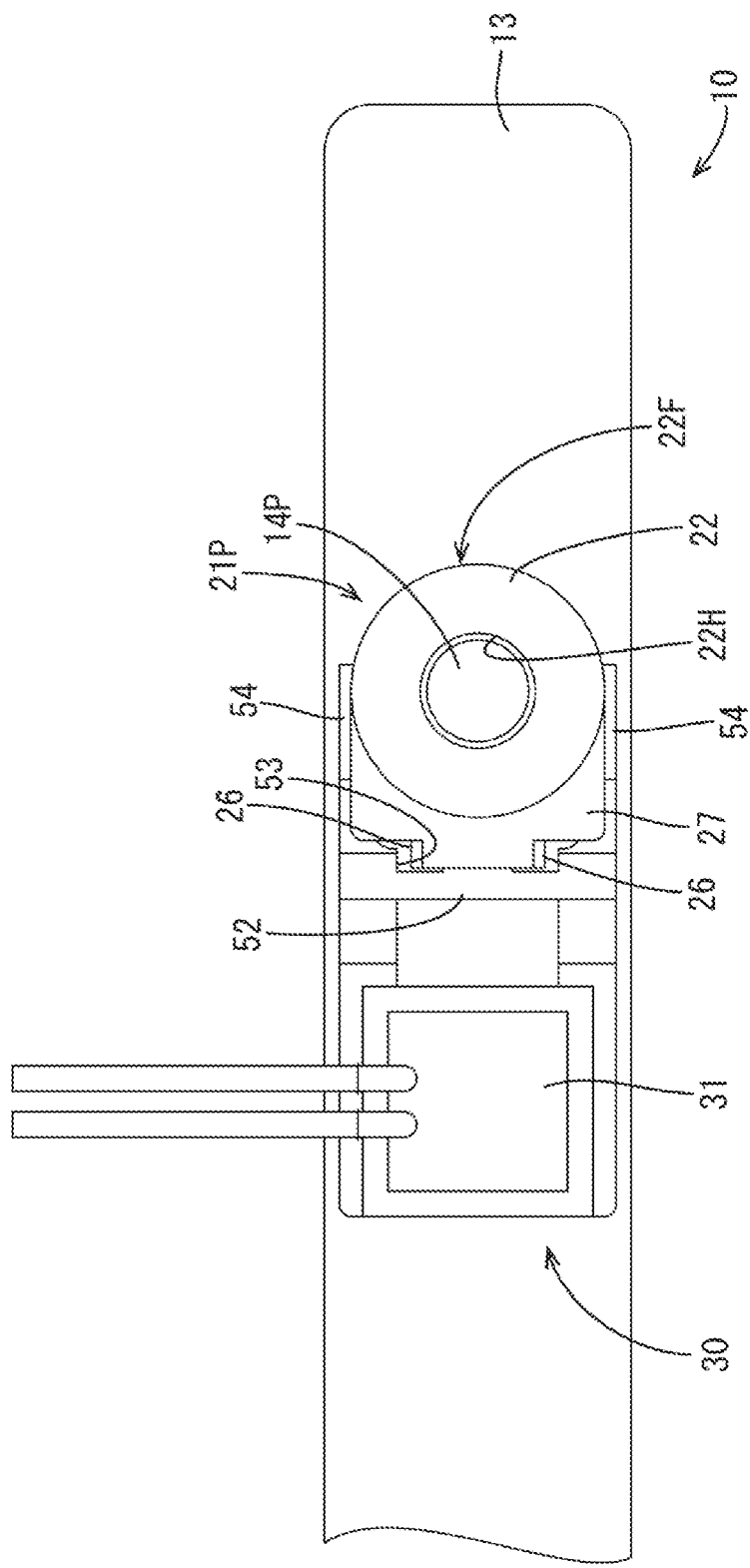
FIG. 2 is a magnified view of a portion of the battery cell with the temperature sensor according to the first embodiment.

As illustrated in FIG. 1, a battery cell 10 includes the battery case 11, a positive electrode terminal 14P, a negative electrode terminal 14N, an insulator 21P, and an insulator 21N. The battery case 11 holds a power generator (not illustrated). The battery case 11 is made of metal. The battery case 11 includes a case body 12 and a cover plate 13 (corresponding to a case wall). The case body 12 is a rectangular container including an opening in one of side surfaces. The cover plate 13 is disposed to cover the opening of the case body 12. The cover plate 13 is an elongated rectangular plate including an outer surface (a top surface in FIG. 3) configured as an electrode disposing surface 13F. The electrode terminals 14P and 14N project from the electrode disposing surface 13F. Each of the electrode terminals 14P and 14N has a columnar shape and projects in a direction perpendicular to the electrode disposing surface 13F.

Figure 6:
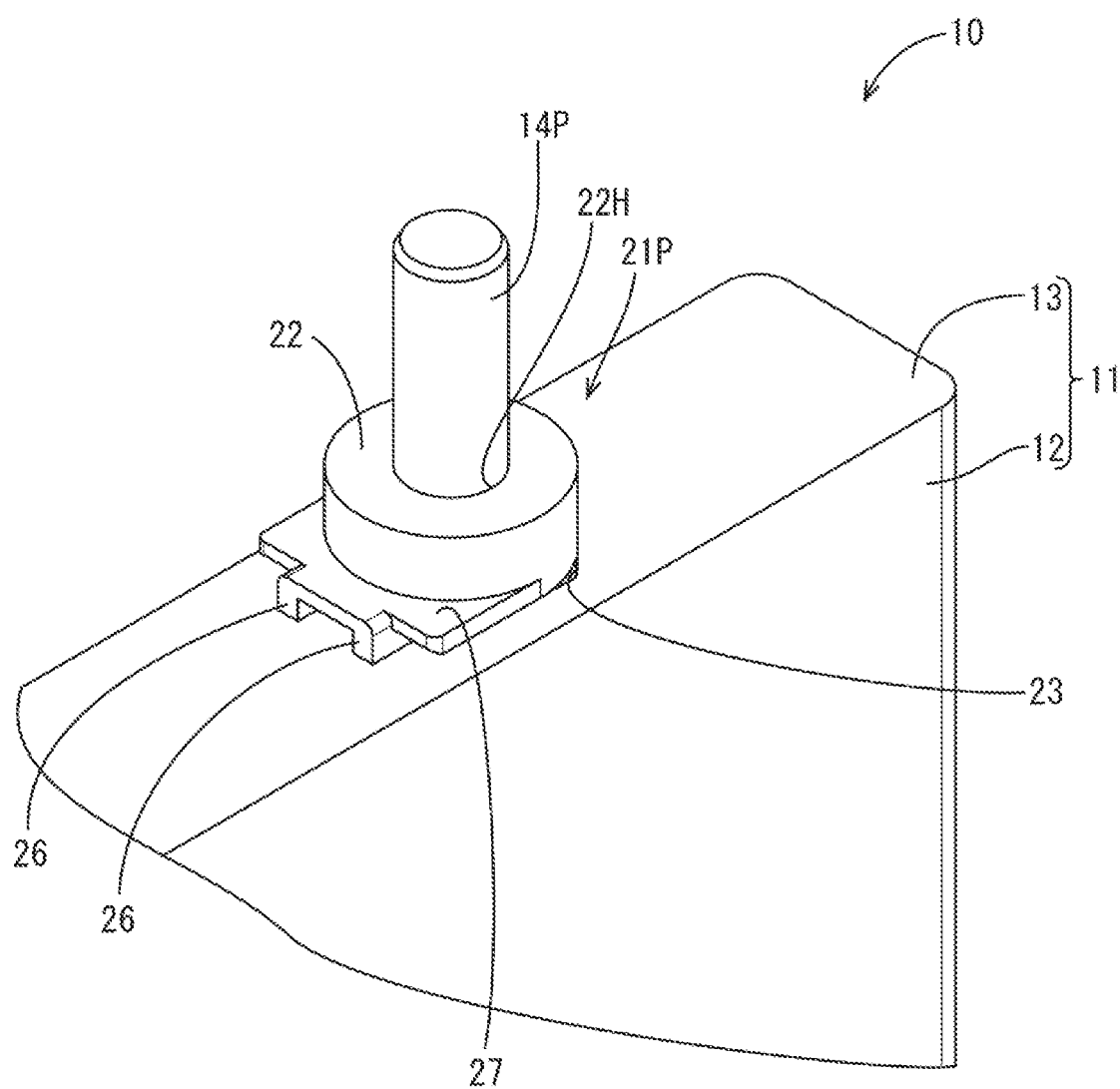
FIG. 6 is a magnified view of a portion of the battery cell in the first embodiment.

The insulators 21P and 21N are attached to the cover plate 13 to insulate the electrode terminals 14P and 14N from the battery case 11 and to hold the electrode terminals 14P and 14N, respectively. The insulator 21P (corresponding to an insulating member), which is one of the insulators 21P and 21N, is configured such that the temperature sensor 30 is mounted thereon. As illustrated in FIG. 6, the insulator 21P includes a body 22, a pair of positioning ribs 26, and a holding wall 27 (corresponding to a holding portion).

As illustrated in FIG. 6, the body 22 is a columnar portion disposed to project outward from the electrode disposing surface 13F. The body 22 includes a hole 22H at the center and the electrode terminal 14P is passed through the hole 22H.

The body 22 includes a pair of locking recesses 23 for holding the temperature sensor 30. Because the locking recesses 23 have configurations similar to each other, one of the locking recesses 23 will be described in detail. Portions of the other one of the locking recesses 23 having the same configurations as those of the one of the locking recesses 23 will be indicated by the same symbols and will not be described.

Figure 7:
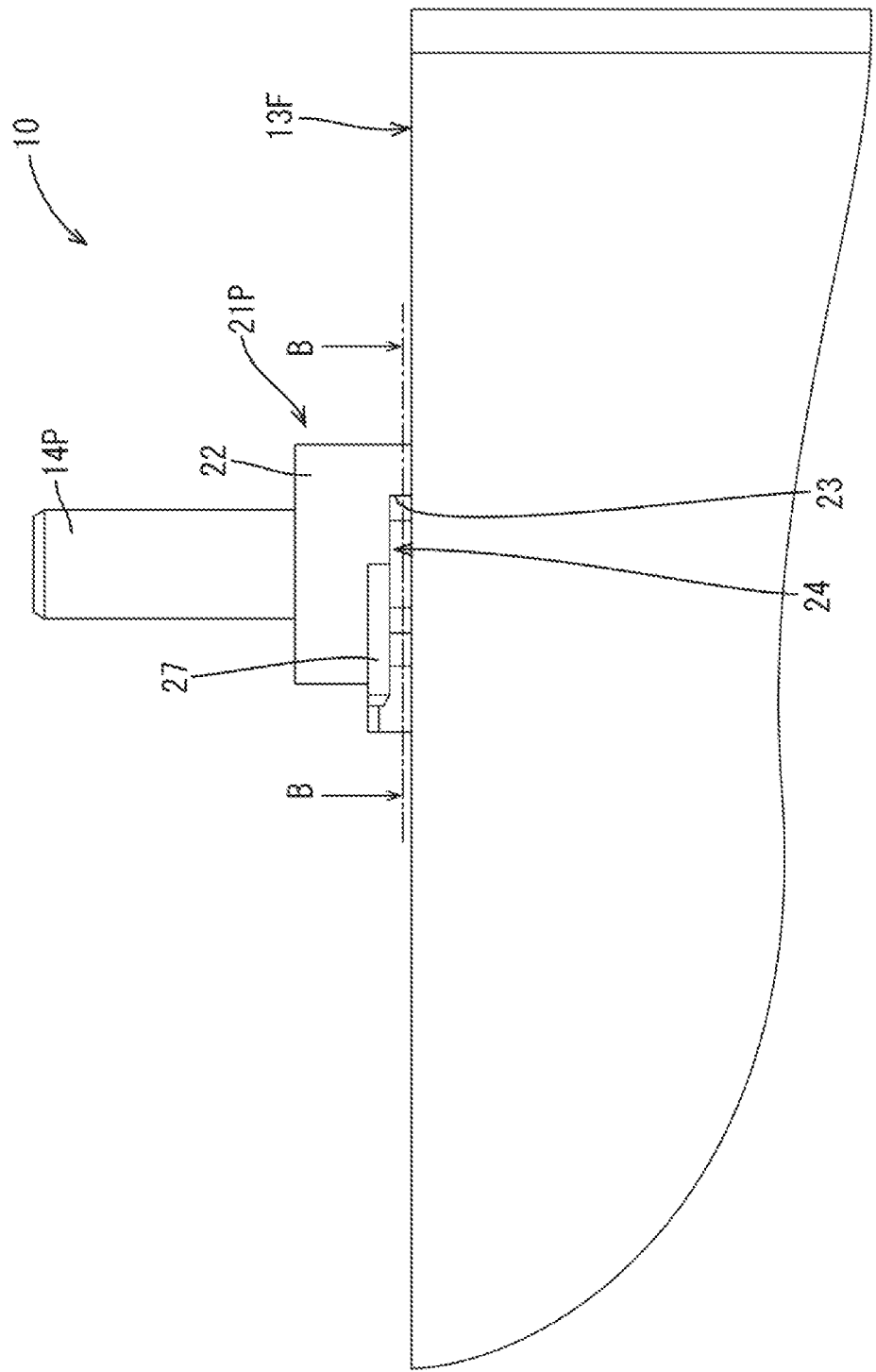
FIG. 7 is a magnified view of a portion of the battery cell in the first embodiment.
Figure 8:
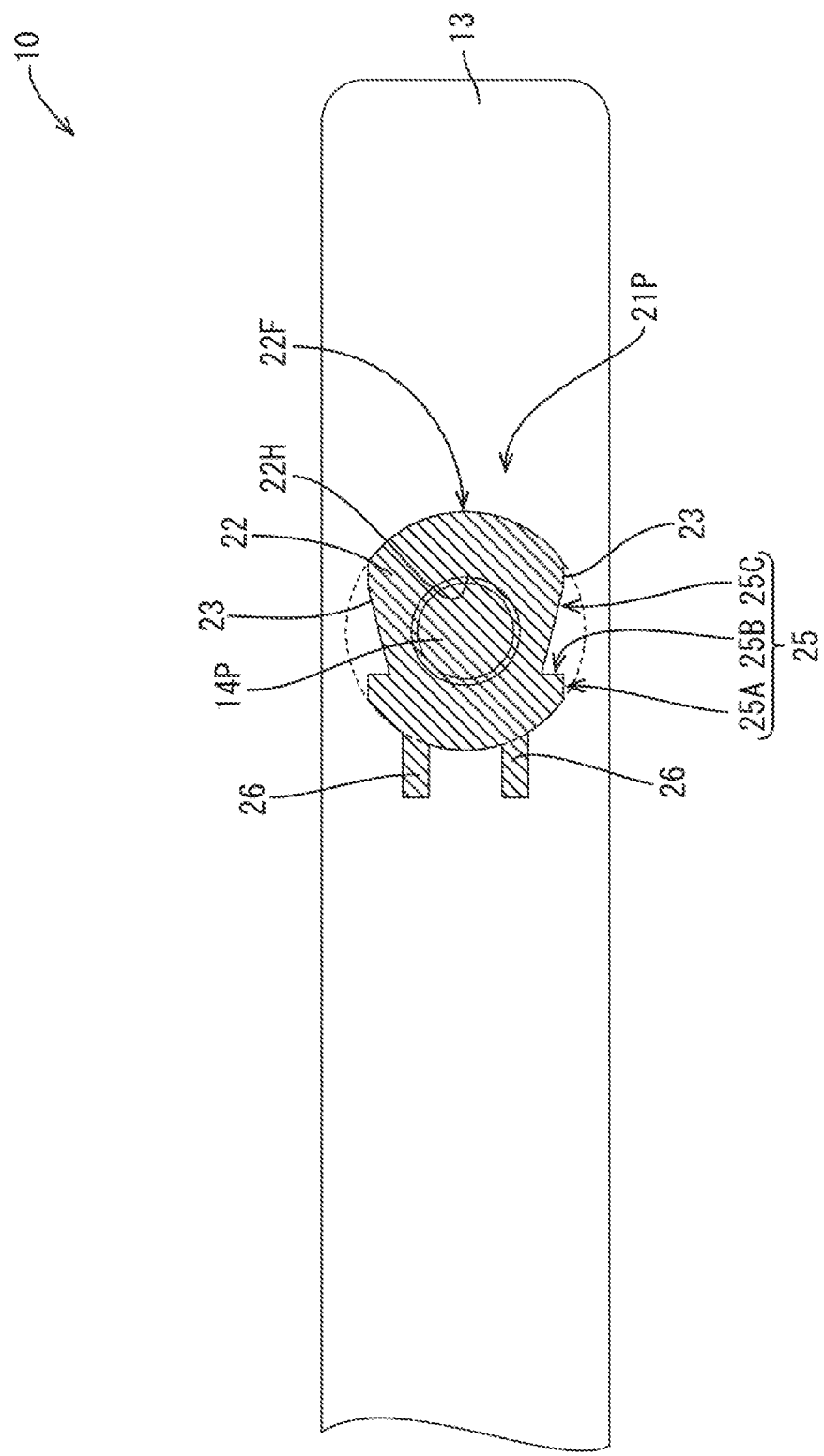
FIG. 8 is a cross-sectional view along line B-B in FIG. 7.

As illustrated in FIGS. 7 and 8, the locking recess 23 is recessed from an outer periphery 22F of the body 22. The locking recess 23 is defined by the electrode disposing surface 13F, a ceiling surface 24, and a back wall surface 25. The ceiling surface 24 is parallel to and separated from the electrode disposing surface 13F. The back wall surface 25 is located on an inner side of the body 22 relative to the outer periphery 22F to connect the ceiling surface 24 to the electrode disposing surface 13F.

As illustrated in FIG. 8, the back wall surface 25 includes an overriding surface 25A, a locking protrusion receiving surface 25B, and a slope surface 25C. The overriding surface 25A extends from the outer periphery 22F of the body 22 to be parallel to a long edge of the cover plate 13. The locking protrusion receiving surface 25B extends from the overriding surface 25A to be perpendicular to the overriding surface 25A (parallel to a short edge of the cover plate 13). The slope surface 25C extends from the locking protrusion receiving surface 25B at an angle to the outer periphery 22F of the body 22 to be coupled with the outer periphery 22F.

As illustrated in FIGS. 6 and 8, the positioning ribs 26 are elongated walls that extend from the outer periphery 22F of the body 22 to be parallel to the long edge of the cover plate 13. The positioning ribs 26 are disposed parallel to each other.

As illustrated in FIG. 6, the holding wall 27 is a plate shaped portion that extends from the outer periphery 22F of the body in the direction in which the positioning ribs 26 extend. The holding wall 27 is separated from the electrode disposing surface 13F such that the positioning ribs 26 are sandwiched between the holding wall 27 and the electrode disposing surface 13F. As illustrated in FIG. 7, one of surfaces of the holding wall 27 (a surface opposed to the electrode disposing surface 13F) is flush with the ceiling surface 24.

Figure 9:
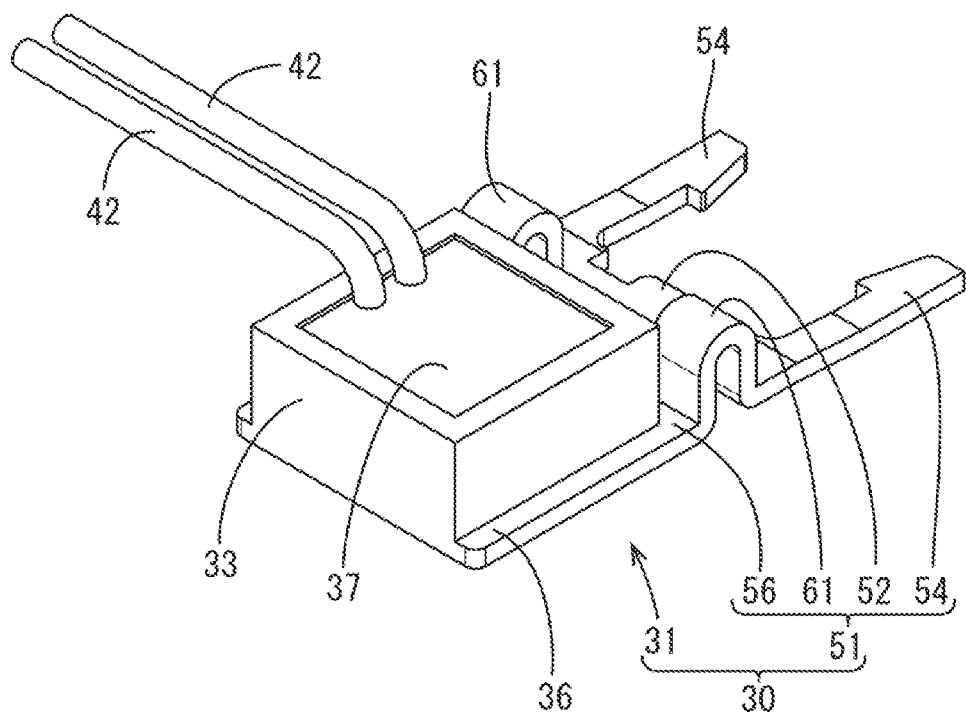
FIG. 9 is a perspective view of the temperature sensor in the first embodiment.

As illustrated in FIG. 9, the temperature sensor 30 includes a temperature sensing portion 31 and an attachment portion 51 that extends from the temperature sensing portion 31.

The temperature sensing portion 31 includes a component holding portion 32, a temperature sensing component 41, a resin sealing portion 37, and a pair of leg portions 36. The component holding portion 32 has a rectangular container shape. The temperature sensing component 41 is disposed in the component holding portion 32 and connected to electric wires 42. The resin sealing portion 37 seals the temperature sensing component 41. The leg portions 36 extend from the component holding portion 32.

Figure 3:
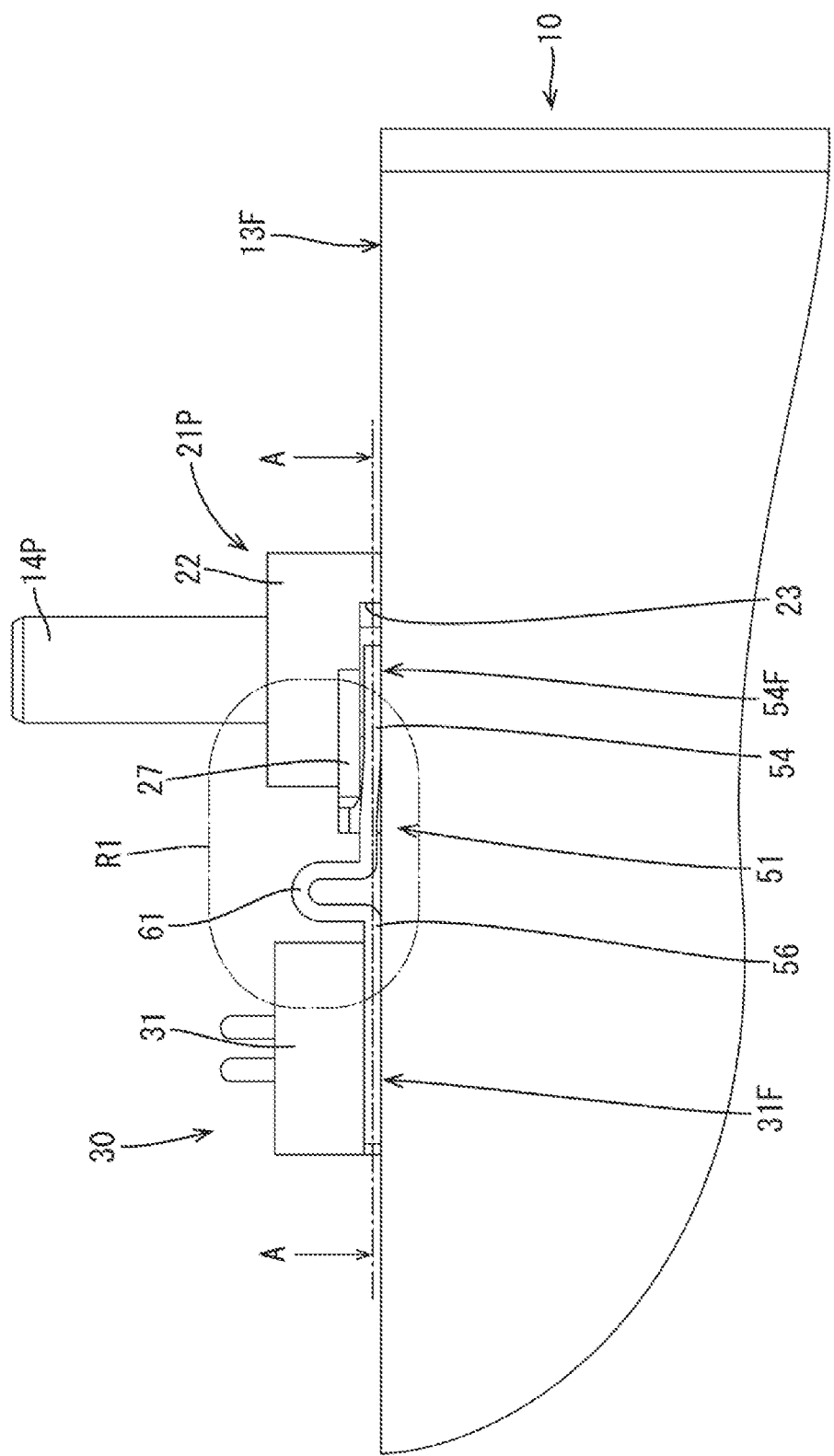
FIG. 3 is a magnified view of a portion of the battery cell with the temperature sensor according to the first embodiment.
Figure 10:
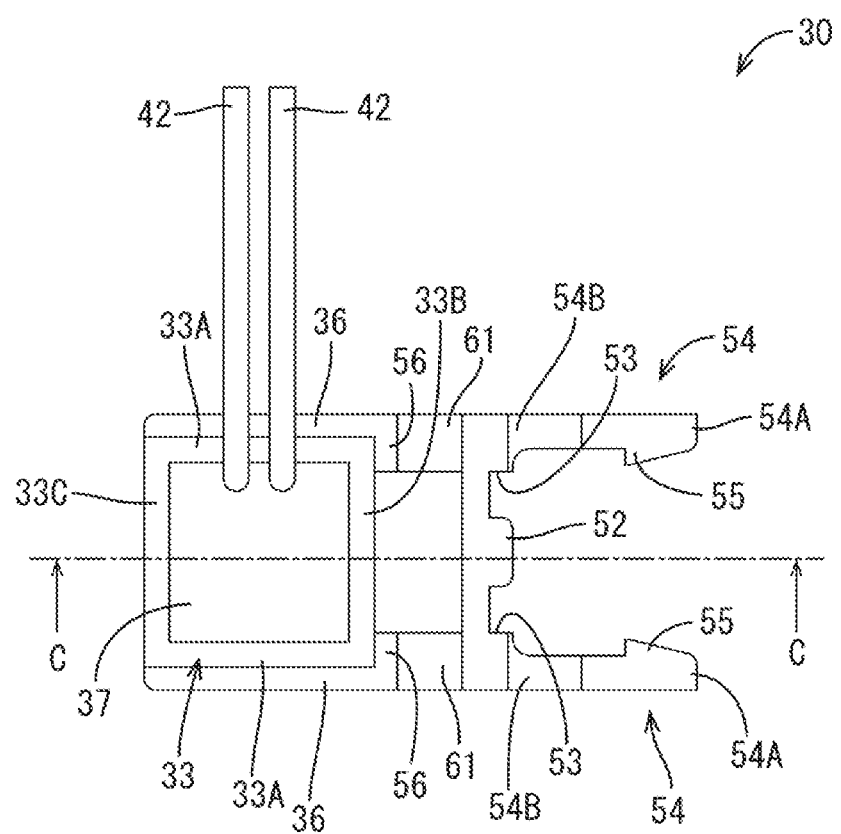
FIG. 10 is a plan view of the temperature sensor in the first embodiment.
Figure 11:
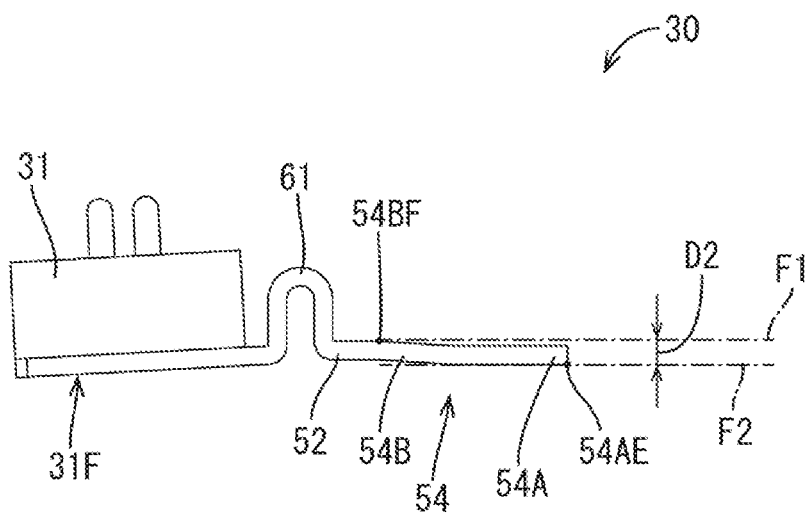
FIG. 11 is a side view of the temperature sensor in the first embodiment.
Figure 12:
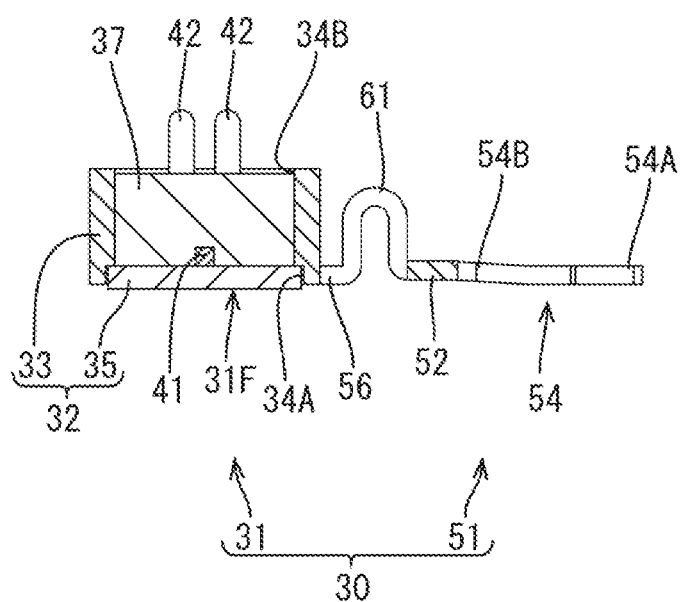
FIG. 12 is a cross-sectional view along line C-C in FIG. 10.

As illustrated in FIG. 12, the component holding portion 32 includes a frame 33 and a heat exchanger plate 35. As illustrated in FIGS. 9 and 12, the frame 33 is a rectangular tube shaped portion including openings 34A and 34B at ends, respectively. As illustrated in FIG. 10, the frame 33 includes first sidewalls 33A, a second sidewall 33B, and a third sidewall 33C. The first sidewalls 33A are disposed parallel to each other. The second sidewall 33B and the third sidewall 33C are perpendicular to the first sidewalls 33A. As illustrated in FIG. 12, the heat exchanger plate 35 is a rectangular metal plate disposed to cover the opening 34A of the frame 33. The surface of the component holding portion 32 on which the heat exchanger plate 35 is disposed is a temperature sensing surface 31F that contact the electrode disposing surface 13F when the temperature sensor 30 is mounted on the battery cell 10 as illustrated in FIGS. 3 and 12.

As illustrated in FIGS. 9 and 10, the leg portions 36 are plate shaped portions that extend from the first sidewalls 33A, respectively. The leg portions 36 extend along edges of the first sidewalls 33A on the temperature sending surface 31F side.

As illustrated in FIG. 12, the temperature sensing component 41 is disposed inside the frame 33 to contact the heat exchanger plate 35. The electric wires 42 connected to the temperature sensing component 41 project to the outside through the opening 34B of the frame 33. The inside of the frame 33 is filled with a resin for sealing and the resin sealing portion 37 is formed in the inside the frame 33. The temperature sensing component 41 is embedded in the resin sealing portion 37.

As illustrated in FIG. 9, the attachment portion 51 (corresponding to a spring portion) includes a pair of extending portions 56, a pair of adjusting portions 61, and a pair of locking arms 54 (corresponding to a locking portion, a sloped portion). The extending portions 56 extend from the temperature sensing portion 31. The adjusting portions 61 extend from the extending portions 56. The locking arms 54 are coupled with the adjusting portions 61 via a positioning rib receiving portion 52.

As illustrated in FIGS. 9 and 10, the extending portions 56 are plate shaped portions that extend from corners defined by the first sidewalls 33A and the second sidewall 33B of the frame 33, respectively. The extending portions 56 extend perpendicular to the second sidewall 33B. The extending portions 56 extend along the edges of the second sidewall 33B on the temperature sensing surface 31F side.

Figure 5:
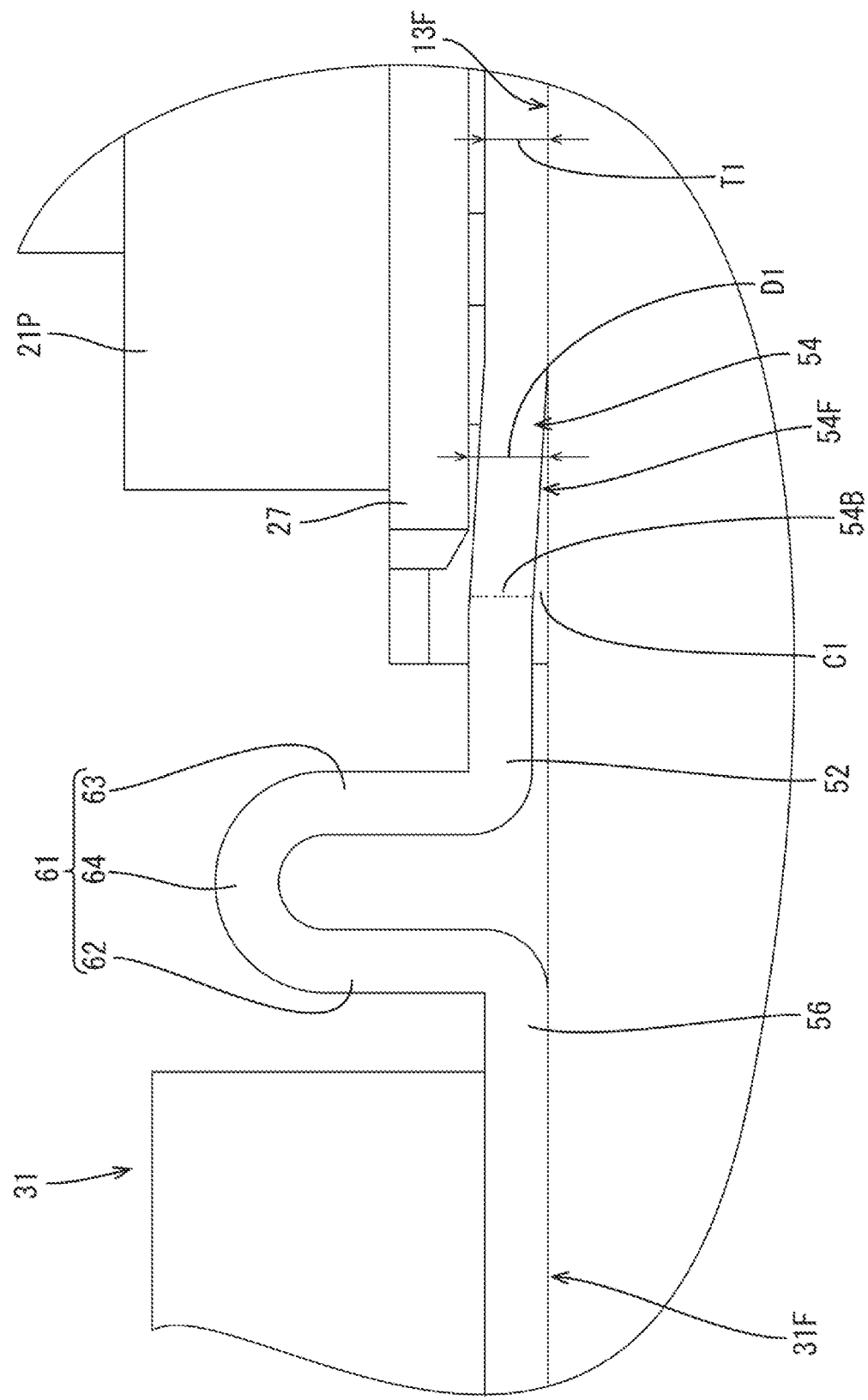
FIG. 5 is a magnified view of a portion in circle R1 in FIG. 3.

As illustrated in FIG. 3, each of the adjusting portions 61 is a plate spring shaped portion that is curved into a U-shape to protrude toward an opposite side from the electrode disposing surface 13F when the temperature sensor 30 is mounted on the battery cell 10. As illustrated in FIG. 5, a pair of linear sections of the U-shape of each of the adjusting protrusions 61 is a pair of changing portions (a first position changing portion 62, a second position changing portion 63). The changing portions change their positions toward each other and away from each other. An end of the first position changing portion 62 and an end of the second position changing portion 63 are coupled with a connecting portion 64 in an arch shape. One of ends of each adjusting portion 61 (an end of the first position changing portion 62 on an opposite side from the connecting portion 64) is connected with the corresponding extending portion 56. The other ends of each adjusting portion 61 (an end of the second position changing portion 63 on an opposite side from the connecting portion 64) is connected with the positioning rib receiving portion 52.

As illustrated in FIG. 10, the positioning rib receiving portion 52 is an elongated plate shaped portion that extends in a direction parallel to the second sidewall 33B. The positioning rib receiving portion 52 includes two positioning recesses 53. The positioning recesses 53 are recessed from an edge of the positioning rib receiving portion 52 on an opposite side from the temperature sensing portion 31. The positioning recesses 53 receive distal ends of the positioning ribs 26, respectively.

As illustrated in FIG. 10, the locking arms 54 are elongated plate shaped portions that extend from ends of the positioning rib receiving portion 52 in an opposite direction from the temperature sensing portion 31. The locking arms 54 are disposed parallel to each other. One of front and back plate surfaces of each locking arm 54 is a battery opposed surface 54F that is opposed to the electrode disposing surface 13F when the temperature sensor 30 is mounted on the battery cell 10.

As illustrated in FIGS. 10 and 12, the locking arms 54 include fixed ends 54B connected with the positioning rib receiving portion 52 and free ends 54A on an opposite side from the fixed ends 54B. The locking arms 54 can warp toward or away from each other. The locking arms 54 include locking protrusions 55 that are locked to the locking protrusion receiving surface 25B of the insulator 21P. As illustrated in FIG. 10, the locking protrusions 55 are plate tab shaped portions that protrude from the free ends 54A of the locking arms 54 inward (toward each other).

As illustrated in FIGS. 3 and 5, when the temperature sensor 30 is mounted on the battery cell 10, the temperature sensing portion 31 is disposed such that an entire area of the temperature sensing surface 31F closely contacts the electrode disposing surface 13F. The positioning rib receiving portion 52 and fixed ends 54B of the locking arms 54 are disposed with a clearance C1 relative to the electrode disposing surface 13F. The locking arms 54 are sloped to become closer to the electrode disposing surface 13F as a distance from the temperature sensing portion 31 increases.

An angle of the locking arm 54 of the temperature sensor 30 before mounted on the battery cell 10 (as in FIG. 11) relative to the temperature sensing surface 31F is greater in comparison to the temperature sensor 30 after mounted on the battery cell 10 (as in FIG. 3).

A plane including edges 54BE of the fixed ends 54B of the locking arms and parallel to the temperature sensing surface 31F before the temperature sensor 30 is mounted on the battery cell 10 is defined as a first imaginary plane F1. A plane including edges 54AE of the free ends 54A of the locking arms 54 on the battery opposed surface 54F side and parallel to the temperature sensing surface 31F is defined as a second imaginary plane F2. Distance D1 between the electrode disposing surface 13F and the holding wall 27 is greater than thickness T1 of the locking arms 54 (a distance between the battery opposed surface 54F and an opposite surface from the battery opposed surface 54F) and less than distance D2 between the first imaginary plane F1 and the second imaginary plane F2 (see FIGS. 5 and 11).

To mount the temperature sensor 30 on the battery cell 10, the temperature sensor 30 is disposed on the electrode disposing surface 13F such that the temperature sensing surface 31F faces the electrode disposing surface 13F and the locking arms 54 face the insulator 21P. Under this condition, the temperature sensor 30 is pressed against the insulator 21P to hold the locking arms 54 in the locking recesses 23. The locking arms 54 warp outward (away from each other) and the locking protrusions 55 slide on the overriding surfaces 25A.

Figure 4:
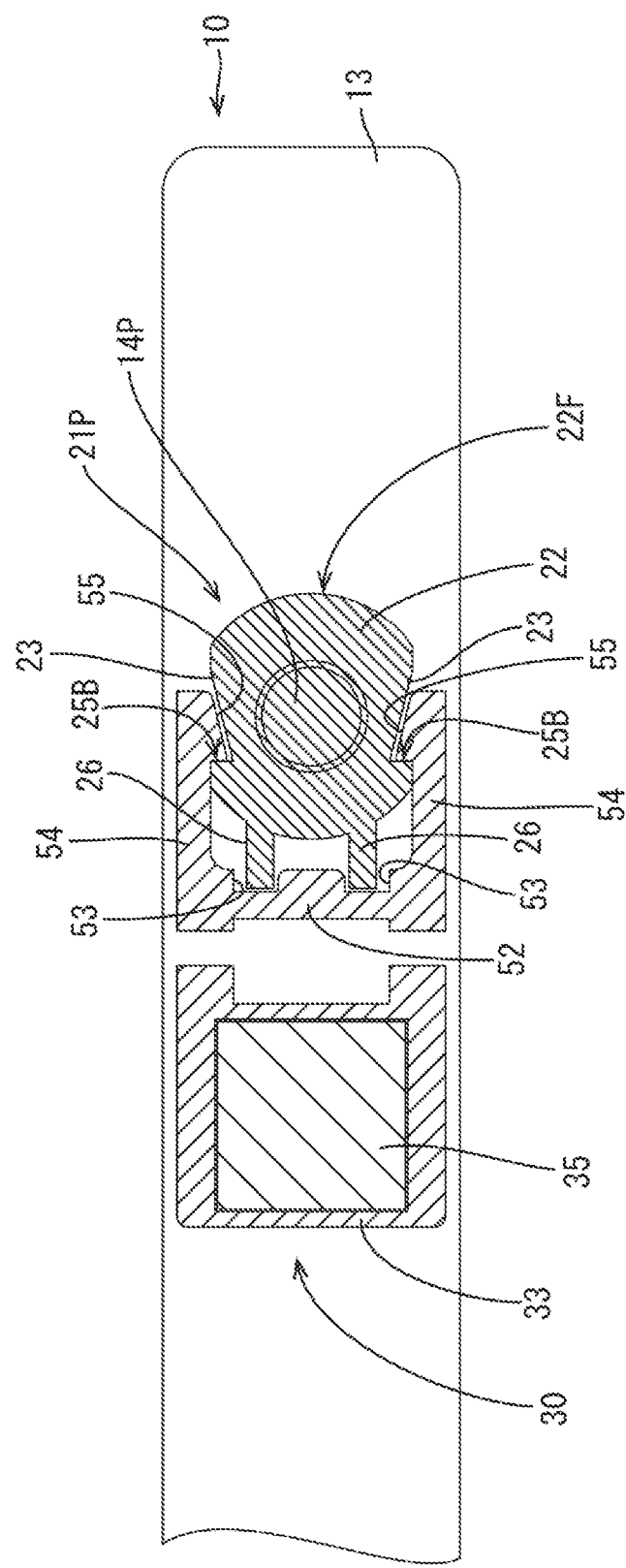
FIG. 4 is a cross-sectional view along line A-A in FIG. 3.

When the temperature sensor 30 is further pushed, as illustrated in FIG. 4, the locking protrusions 55 slide over the overriding surfaces 25A and the locking arms 54 restore their original shape. The locking protrusions 55 are locked to the locking protrusion receiving surfaces 25B and the attachment portion 51 is attached to the insulator 21 and held in this position. As illustrated in FIG. 4, the distal ends of the positioning ribs 26 are inserted into the positioning rib receiving portion 52, respectively, to position the temperature sensor 30 relative to the body 22 and to restrict the temperature sensor 30 from rotating along the outer peripheral surface 22F.

As illustrated in FIGS. 3 and 5, the locking arms 54 are inserted in a gap between the holding wall 27 and the electrode disposing surface 13F. As described above, distance D1 between the electrode disposing surface 13F and the holding wall 27 is less than distance D2 between the first imaginary plane F1 and the second imaginary plane F2. Therefore, when the locking arms 54 are in the gap between the holding wall 27 and the electrode disposing surface 13F, the holding wall 27 is in a state to press the fixed ends 54B of the locking arms 54 toward the electrode disposing surface 13F. In comparison to the state before mounted on the battery cell 10, the slopes of the locking arms 54 of the temperature sensor 30 are more gentle and the adjusting portions 61 deform to spread (such that the first position changing portion 62 and the second position changing portion 63 are away from each other). With the deformation, the temperature sensing surface 31F is pressed against the electrode disposing surface 13F. Namely, the temperature sensing surface 31F closely contacts the electrode disposing surface 13F to obtain the proper accuracy of the temperature measurement. Furthermore, the locking arms 54 and the adjusting portions 61 deform by predefined amounts according to a size tolerance of the battery cell 10. Therefore, the size tolerance of the battery cell 10 can be compensated.

As described above, the sensor mounting structure in this embodiment is a structure for mounting the temperature sensor 30 on the battery cell 10. The battery cell 10 includes the electrode terminal 14P, the battery case 11, and the insulator 21P. The battery case 11 includes the cover plate 13 that includes the outer surface configured as the electrode disposing surface 13F. The insulator 21P is a component that is mounted on the cover plate 13. The insulator 21P insulates the electrode terminal 14P from the cover plate 13 and holds the electrode terminal 14P. The temperature sensor 30 holds the temperature sensing component 41. The temperature sensor 30 includes the temperature sensing portion 31 and the locking arms 54. The temperature sensing portion 31 includes the temperature sensing surface 31F that contacts the electrode disposing surface 13F. The locking arms 54 are locked to the insulator 21P. The temperature sensor 30 further includes the attachment portion 51 to hold the temperature sensing component 41 in close contact with the electrode disposing surface 13F.

According to the configuration described above, the locking arms 54 of the temperature sensor 30 are locked to the insulator 21P using the insulator 21P included in the battery case. In comparison to the conventional configuration in which the thermistor is mounted on the battery via the baseplate, the overall structure for mounting the sensor can be simplified because the baseplate is not used.

Because the baseplate is not used, the size tolerance is less likely to affect. Therefore, a spring structure for holding the temperature sensing component 41 in close contact with the electrode disposing surface 13F can be simplified.

For the above reasons, the proper accuracy of the temperature measurement is obtained with the simplified structure of mounting the temperature sensor 30.

The adjusting portions 61 include the first position changing portions 62 and the second position changing portions 63. The first position changing portions 62 extend from the temperature sensing portion 31. The second position changing portions 63 extend from the locking arms 54 and change their positions toward and away from the first position changing portions 62. The locking arms 54 are sloped to become closer to the electrode disposing surface 13F as the distance from the temperature sensing portion 31 increases. The insulator 21P includes the holding wall 27 to press the locking arms 45 toward the electrode disposing surface 13F.

According to the configuration described above, the slopes of the locking arms 54 of the temperature sensor 30 become gentler with the holding wall 27 presses the locking arms 54 toward the electrode disposing surface 13F. The adjusting portions 61 deform to spread. The temperature sensing surface 31F is pressed against the electrode disposing surface 13F. With such a simple spring structure, the temperature sensing surface 31F closely contacts the electrode disposing surface 13F to obtain the proper accuracy of the temperature measurement.

Second Embodiment

Figure 13:
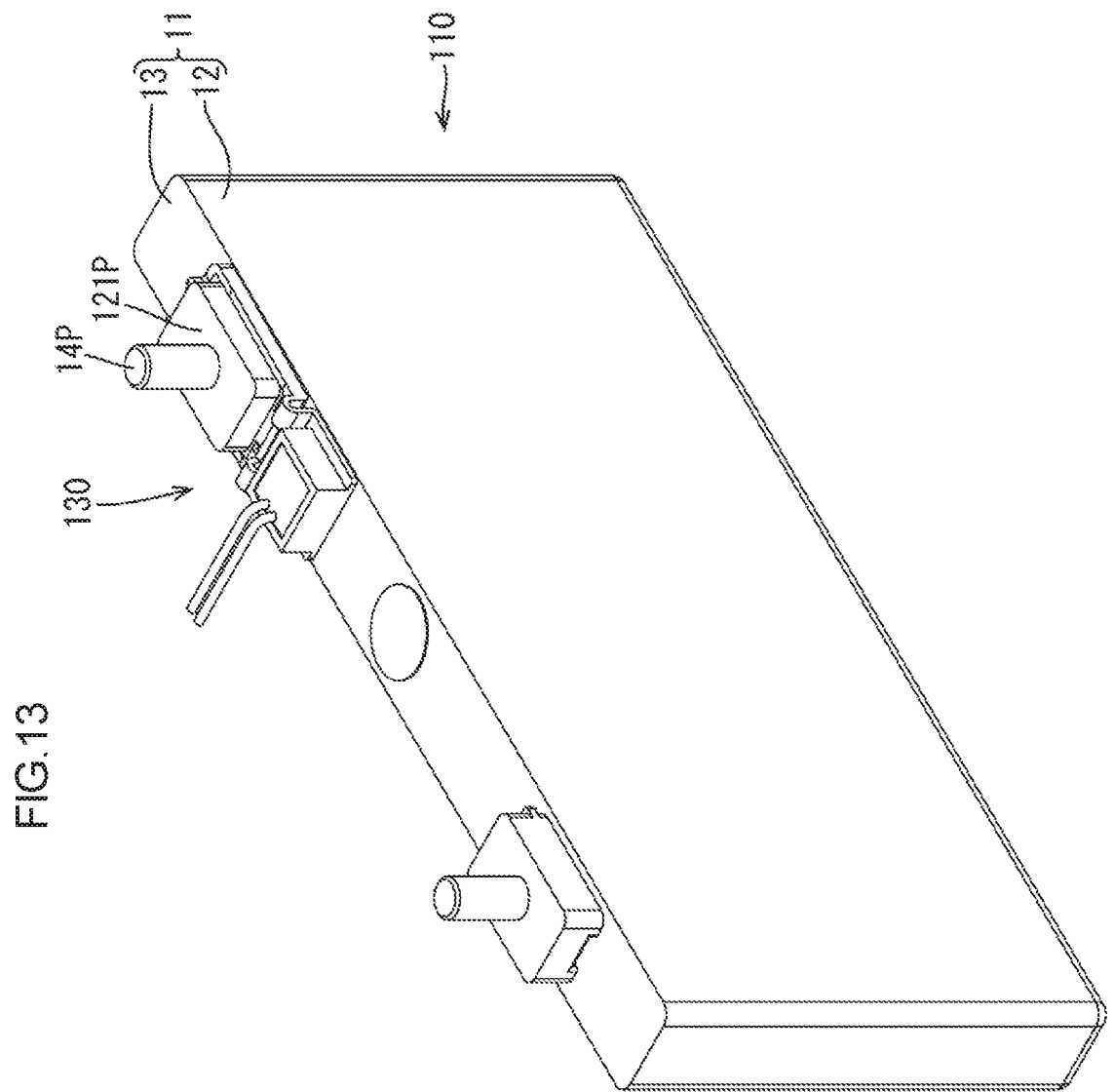
FIG. 13 is a perspective view of a battery with a temperature sensor according to a second embodiment.

A second embodiment will be described with reference to FIGS. 13 to 25. A sensor mounting structure according to this embodiment is a structure (see FIG. 13) for mounting a temperature sensor 130 on the battery case 11 (corresponding to a case) of a battery cell 110 (corresponding to an electric storage component), similar to the first embodiment. This embodiment includes an insulator 121P (corresponding to an insulating member) and an attachment portion 151 (corresponding to a spring portion) having configurations different from the first embodiment. In this embodiment, the configurations similar to the first embodiment will be indicated by the same symbols and will not be described.

Figure 20:
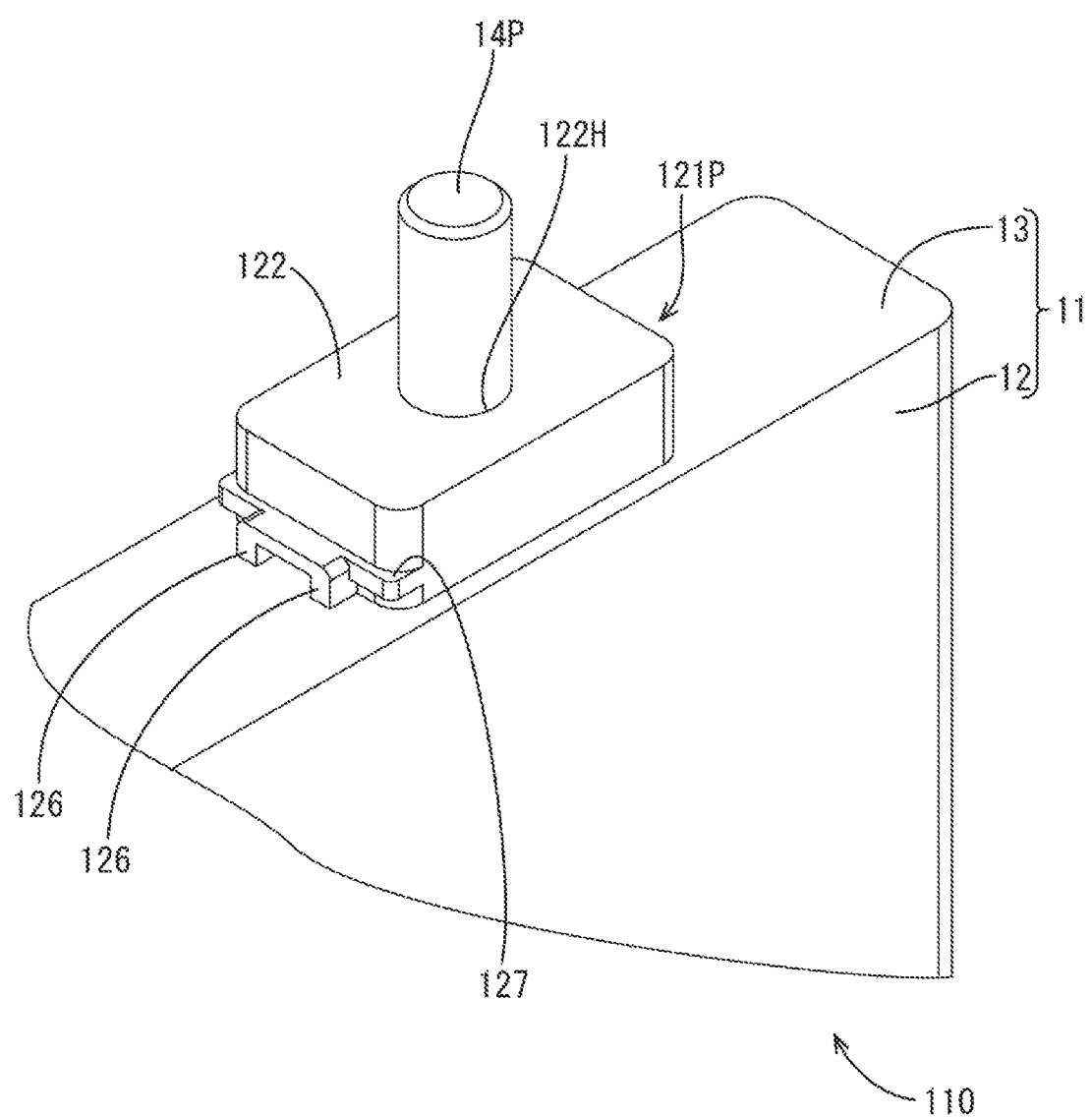
FIG. 20 is a magnified perspective view of a portion of the battery cell in the second embodiment.
Figure 21:
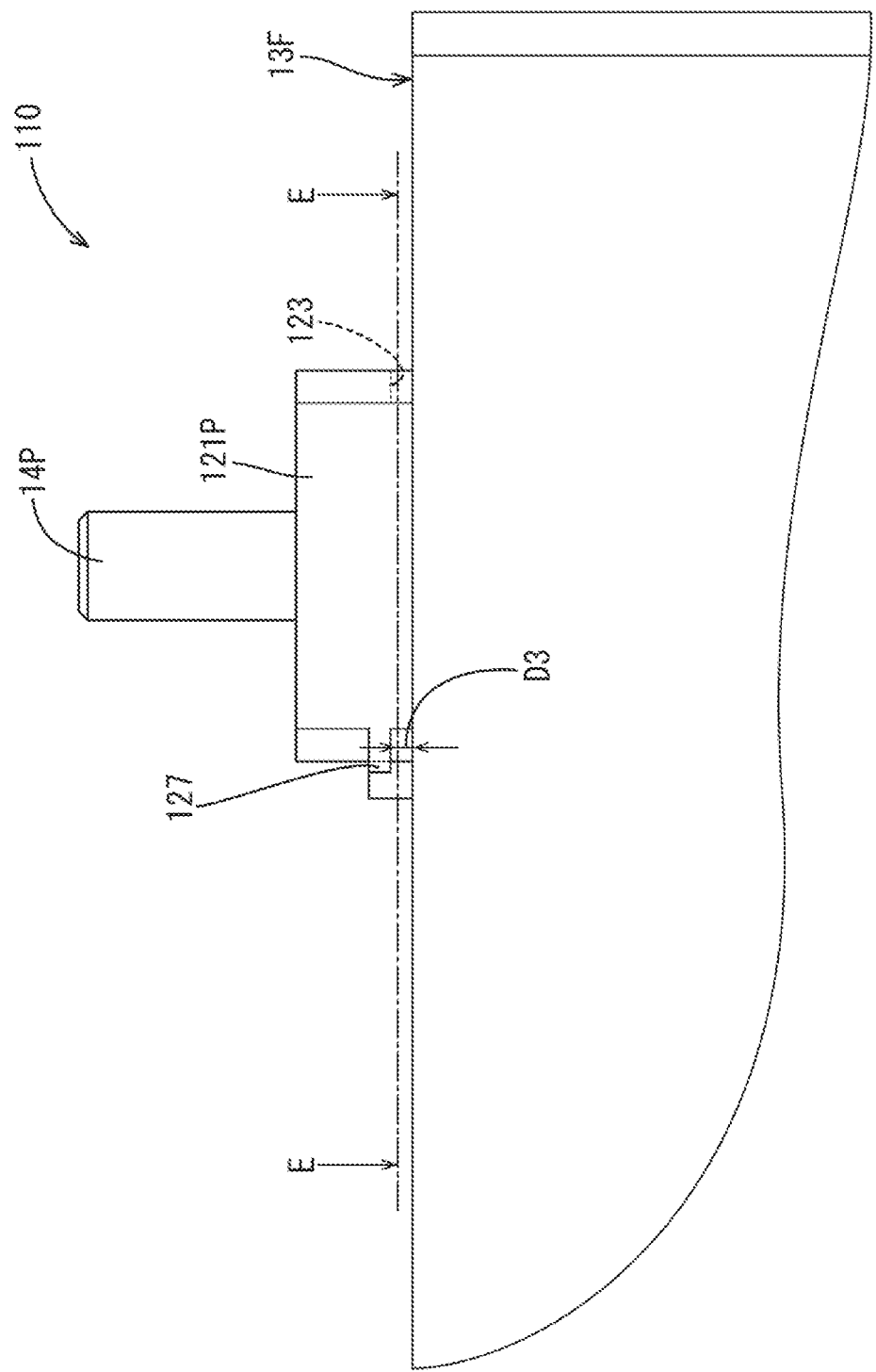
FIG. 21 is a magnified side view of a portion of the battery cell in the second embodiment.
Figure 22:
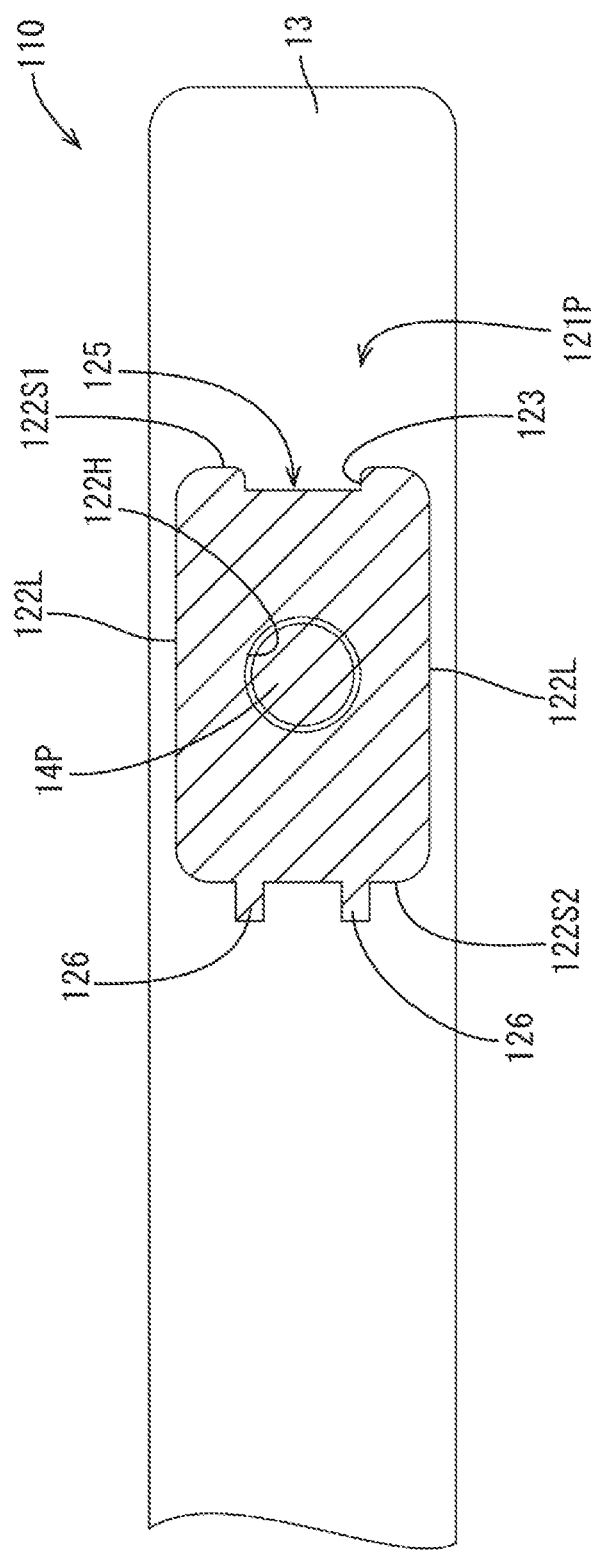
FIG. 22 is a cross-sectional view along line E-E in FIG. 21.

As illustrated in FIGS. 20 and 22, the insulator 121P includes a body 122, a pair of positioning ribs 126, and a holding wall 127 (corresponding to a holding portion). The body 122 includes a locking recess 123. As illustrated in FIG. 20, the body 122 is a cuboid portion that protrudes from the electrode disposing surface 13F and includes a hole 122H at the center. The electrode terminal 14P is passed through the hole 122H.

As illustrated in FIG. 22, four sidewalls of the body 122 (surfaces perpendicular to the cover plate 13) include a pair of long walls 122L parallel to the long edges of the cover plate 13 and a pair of short walls 122S1 and 122S2 parallel to the short edges of the cover plate 13.

Figure 16:
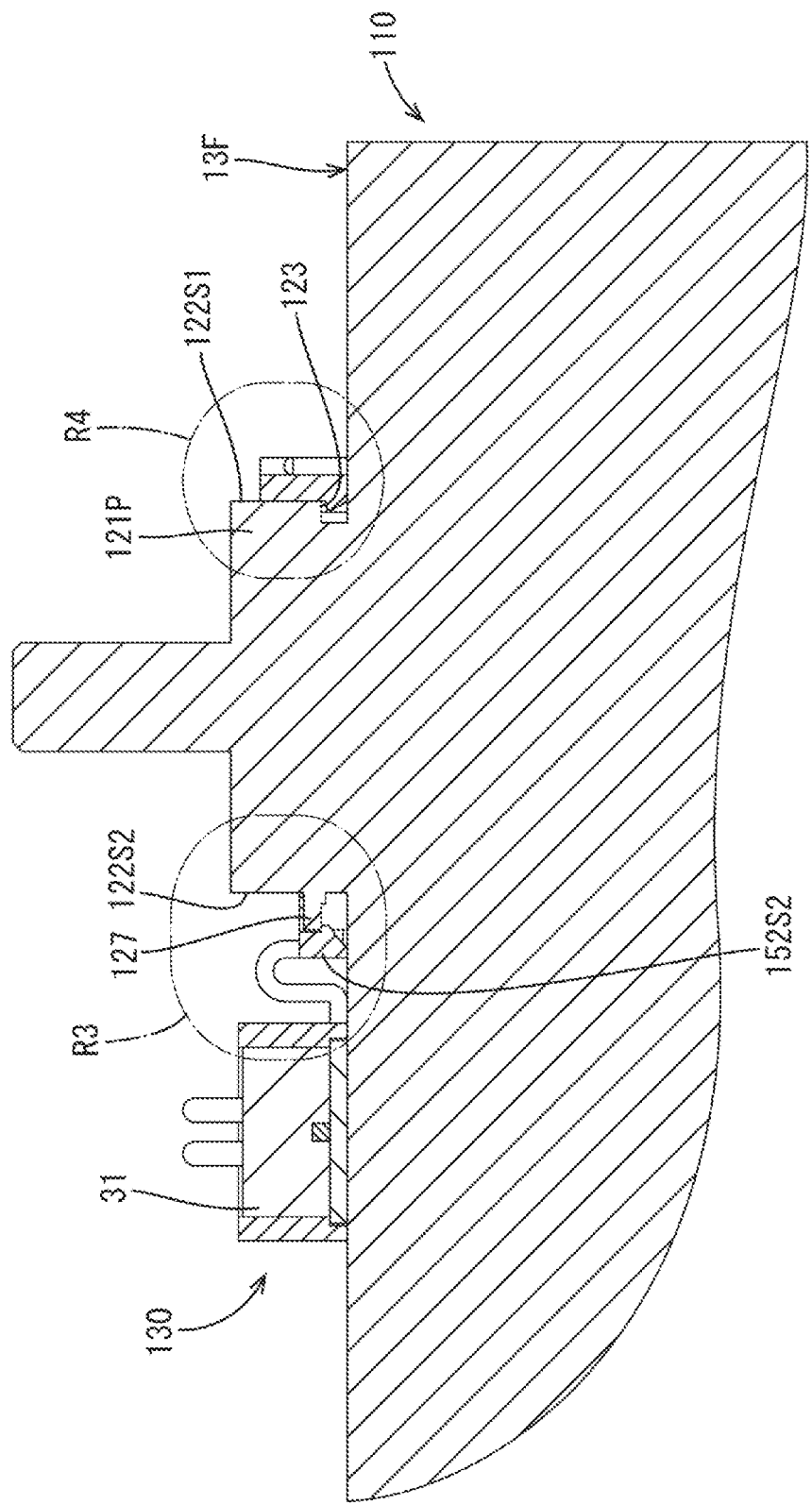
FIG. 16 is a cross-sectional view along line D-D in FIG. 14.
Figure 19:
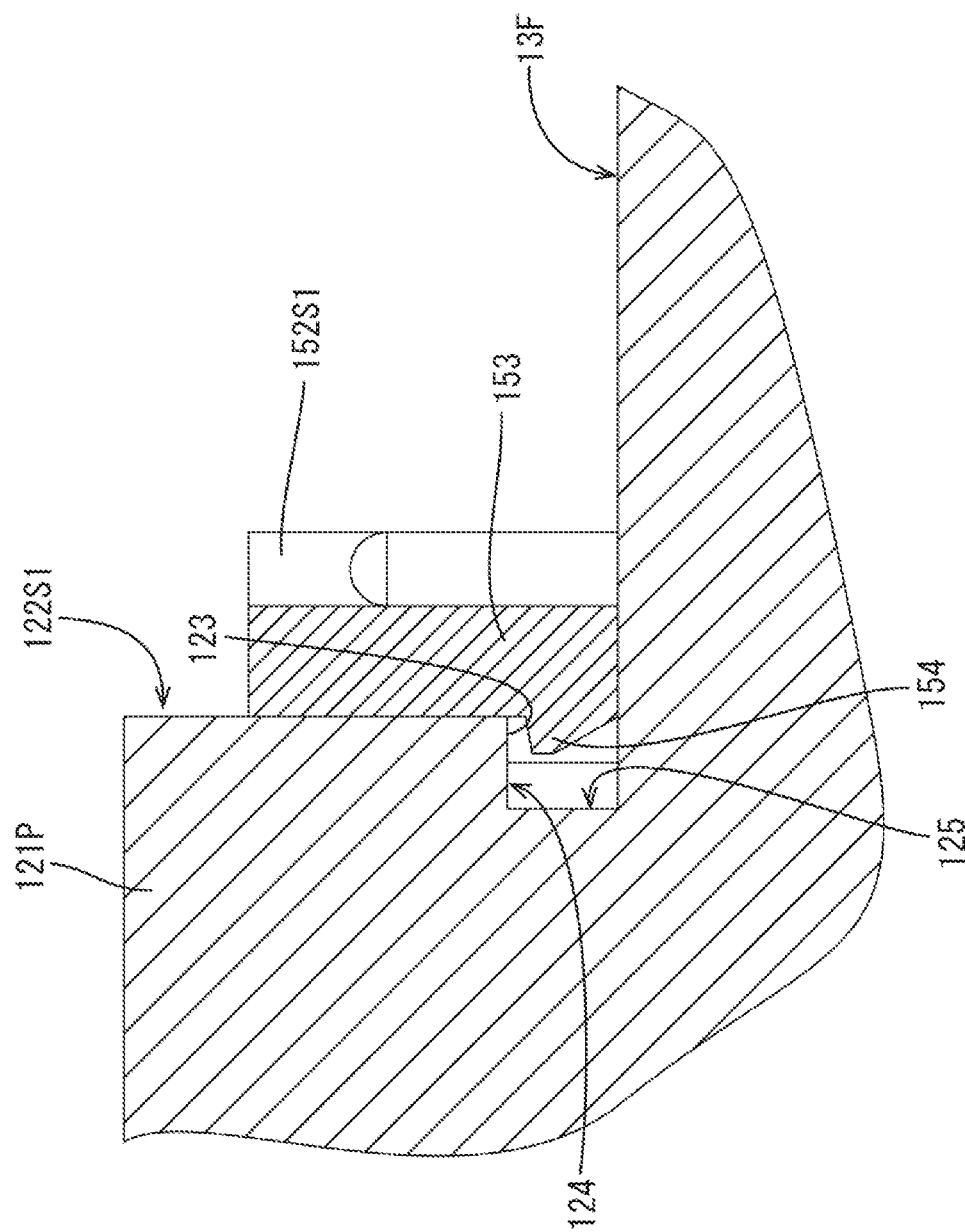
FIG. 19 is a magnified view of a portion in circle R4 in FIG. 16.

As illustrated in FIGS. 16, 19, and 22, the locking recess 123 is recessed inward (toward the second short wall 122S2) from the first short wall 122S1 of the pair of short walls 122S1 and 122S2. The locking recess 123 is defined by the electrode disposing surface 13F, a locking protrusion receiving surface 124, and a back wall surface 125. The locking protrusion receiving surface 124 is disposed parallel to and separated from the electrode disposing surface 13F. The back wall surface 125 is disposed inner than the first short wall 122S1 and connects the locking protrusion receiving surface 124 to the electrode disposing surface 13F. The locking recess 123 is located in the middle between long edges.

As illustrated in FIGS. 20 and 22, the positioning ribs 126 are elongated walls that extend from the second short wall 122S2 of the body 122 at a right angle. The positioning ribs 126 are parallel to each other.

Figure 18:
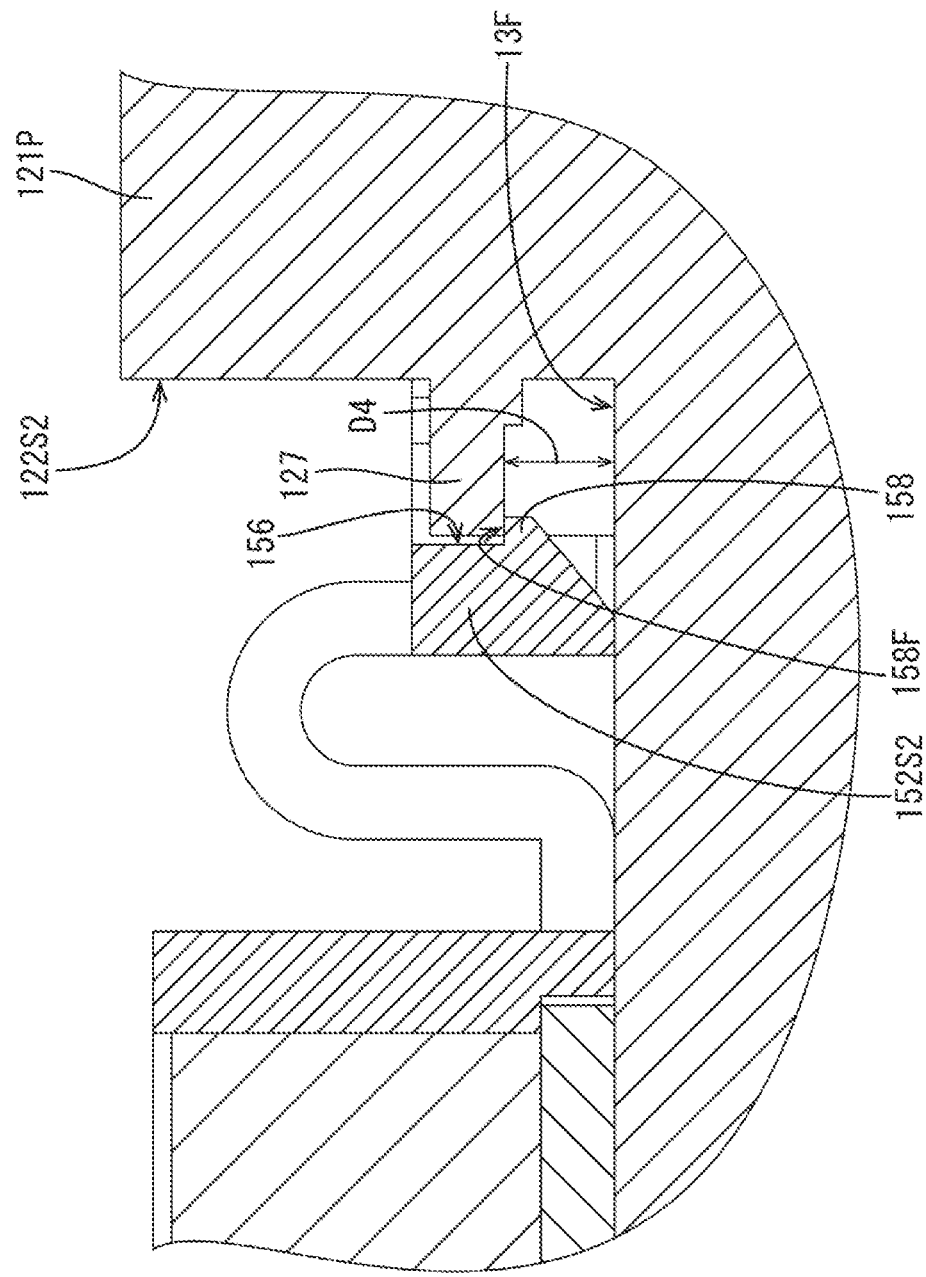
FIG. 18 is a magnified view of a portion in circle R3 in FIG. 16.

As illustrated in FIGS. 16, 18, and 20, the holding wall 127 is a plate shaped portion that extends from the second short wall 122S2 of the body 122 at a right angle. The holding wall 127 is disposed parallel to and separated from the electrode disposing surface 13F. As illustrated in FIG. 20, the holding wall 127 is disposed such that the positioning ribs 26 are sandwiched between the holding wall 127 and the electrode disposing surface 13F. A middle section of the holding wall 127 between the positioning ribs 126 extends to the same position as the positioning ribs 126. Edges of outer sections of the holding wall 127 than the middle section are located inner than an edge of the middle section. In FIGS. 16, 18, and 19, a cross section of the battery cell 110 is schematically illustrated.

Figure 23:
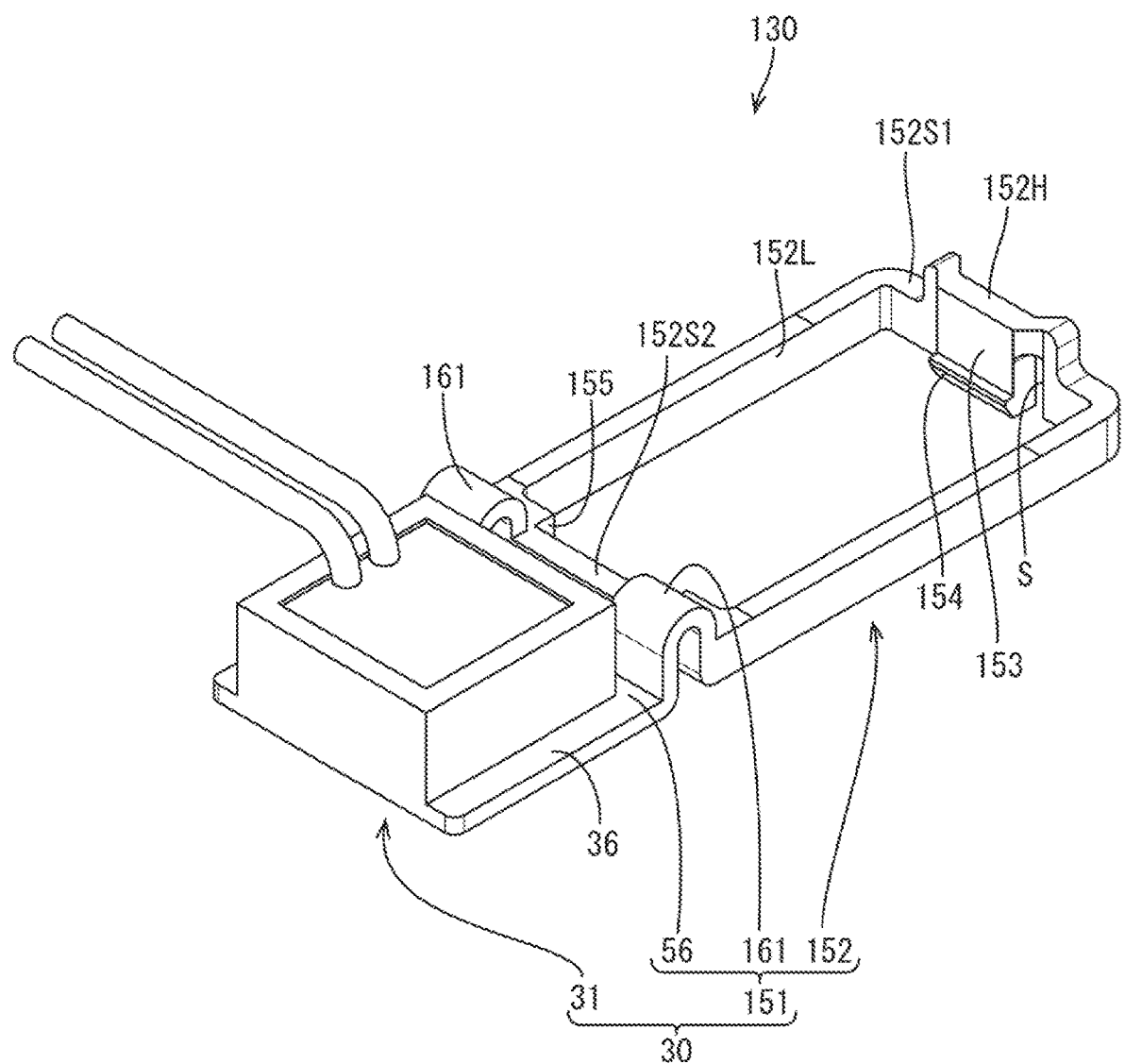
FIG. 23 is a perspective view of the temperature sensor in the second embodiment.

As illustrated in FIG. 23, the attachment portion 151 (corresponding to the spring portion) includes a pair of extending portions 56, a pair of adjusting portions 161, and a locking frame 152 (corresponding to a locking portion, a sloped portion). The extending portions 56 extend from the temperature sensing portion 31. The adjusting portions 161 extend from the extending portions 56. The locking frame 152 extends from the adjusting portions 161.

Figure 14:
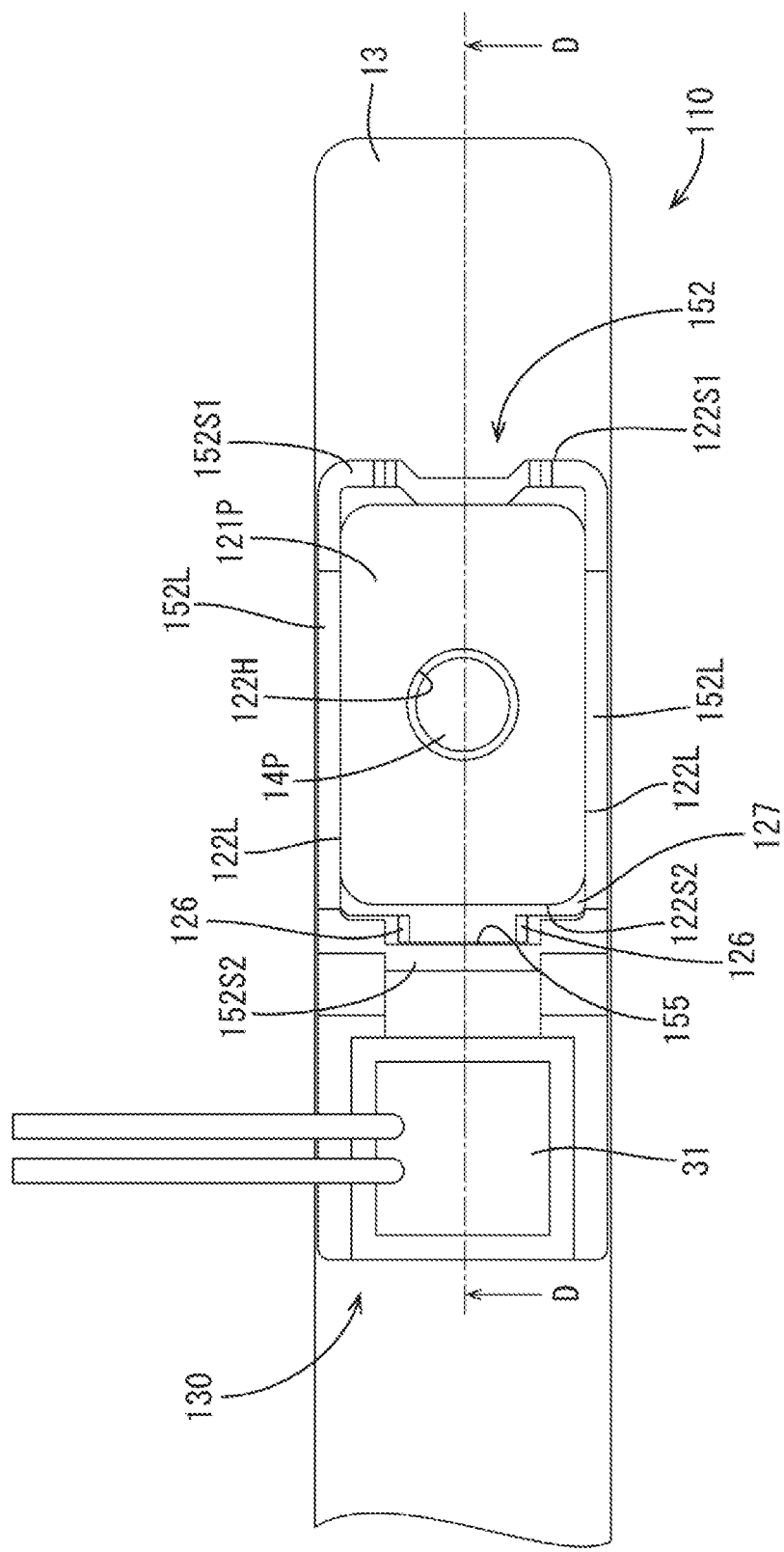
FIG. 14 is a magnified plan view of a portion of the battery cell with the temperature sensor according to the second embodiment.
Figure 15:
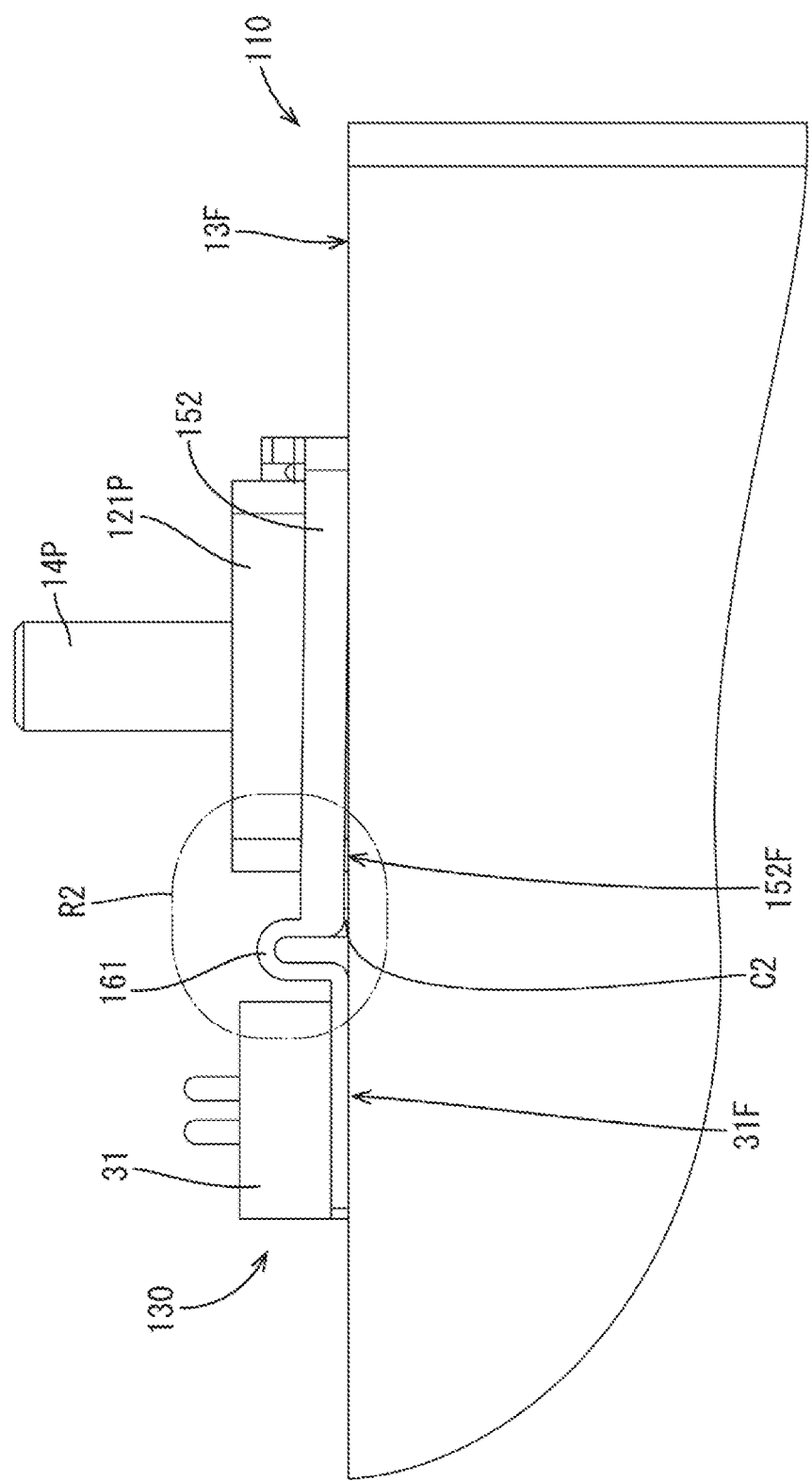
FIG. 15 is a magnified side view of a portion of the battery cell with the temperature sensor according to the second embodiment.

As illustrated in FIGS. 23 and 24, the locking frame 152 is a rectangular frame shaped portion. The locking frame 152 includes a pair of short frame portions 152S1 and 152S2 and a pair of long frame portions 152L. The short frame portions 152S1 and 152S2 are disposed parallel to the second sidewall 33B of the temperature sensing portion 31 and separated from each other. The long frame portions 152L are disposed perpendicular to the short frame portions 152S1 and 152S2. The long frame portions 152L connect ends of the short frame portion 152S1 to ends of the short frame portion 152S2. As illustrated in FIG. 14, the locking frame 152 is disposed to surround the insulator 121P. The long frame portions 152L are disposed along the long walls 122L, respectively. A first short frame portion 152S1 is disposed along the first short wall 122S1 and a second short frame portion 152S2 is disposed along the second short wall 122S2. As illustrated in FIG. 15, when the temperature sensor 130 is mounted on the battery cell 110, an end surface of the attachment portion 151 opposed to the electrode disposing surface 13F is defined as a battery opposed surface 152F.

As illustrated in FIGS. 23 and 24, the short frame portion 152S1 of the pair of short frame portions 152S1 and 152S2 farther from the temperature sensing portion 31 includes a tall section 152H. The tall section 152H is located at the middle between the long frame portions 152L. The tall section 152H has a height (a dimension between the battery opposed surface 152F and an end surface on an opposite side from the battery opposed surface 152F) is greater than heights of other sections.

A part of the tall section 152H is configured as a locking arm 153. As illustrated in FIG. 23, the tall section 152H includes a pair of slits S that extend from the battery opposed surface 152F. The slits S are separated from each other. The part between the slits S is the locking arm 153. The locking arm 153 includes a free end on a battery opposed surface 152F side and a fixed end on an opposite side from the battery opposed surface 152F. The locking arm 153 is flexible to warp toward and away from the short frame portion 152S2. The locking arm 153 includes a locking protrusion 154. As illustrated in FIG. 23, the locking protrusion 154 protrudes from the free end of the locking arm 153 toward the short frame portion 152S2.

As illustrated in FIGS. 23 and 24, the short frame portion 152S2 of the pair of short frame portions 152S1 and 152S2 closer to the temperature sensing portion 31 includes a positioning recess 155 and a locking protrusion 158 disposed inside the positioning recess 155. As illustrated in FIG. 24, the positioning recess 155 is recessed from an inner surface of the short frame portion 152S2 (a surface facing the short frame portion 152S1). The positioning recess 155 is defined by a back wall surface 156 and sidewall surfaces 157. The back wall surface 156 is parallel to the inner surface of the short frame portion 152S2. The sidewall surfaces 157 extend from the back wall surface 156 to the inner surface of the short frame portion 152S2. As illustrated in FIG. 14, the positioning recess 155 can receive distal ends of the positioning ribs 126. As illustrated in FIGS. 18 and 24, the locking protrusion 158 protrudes from the back wall surface 156 toward the short frame portion 152S1 and extends perpendicular to the back wall surface 156. The locking protrusion 158 includes a contact surface 158F that contacts the holding wall 127.

Figure 17:
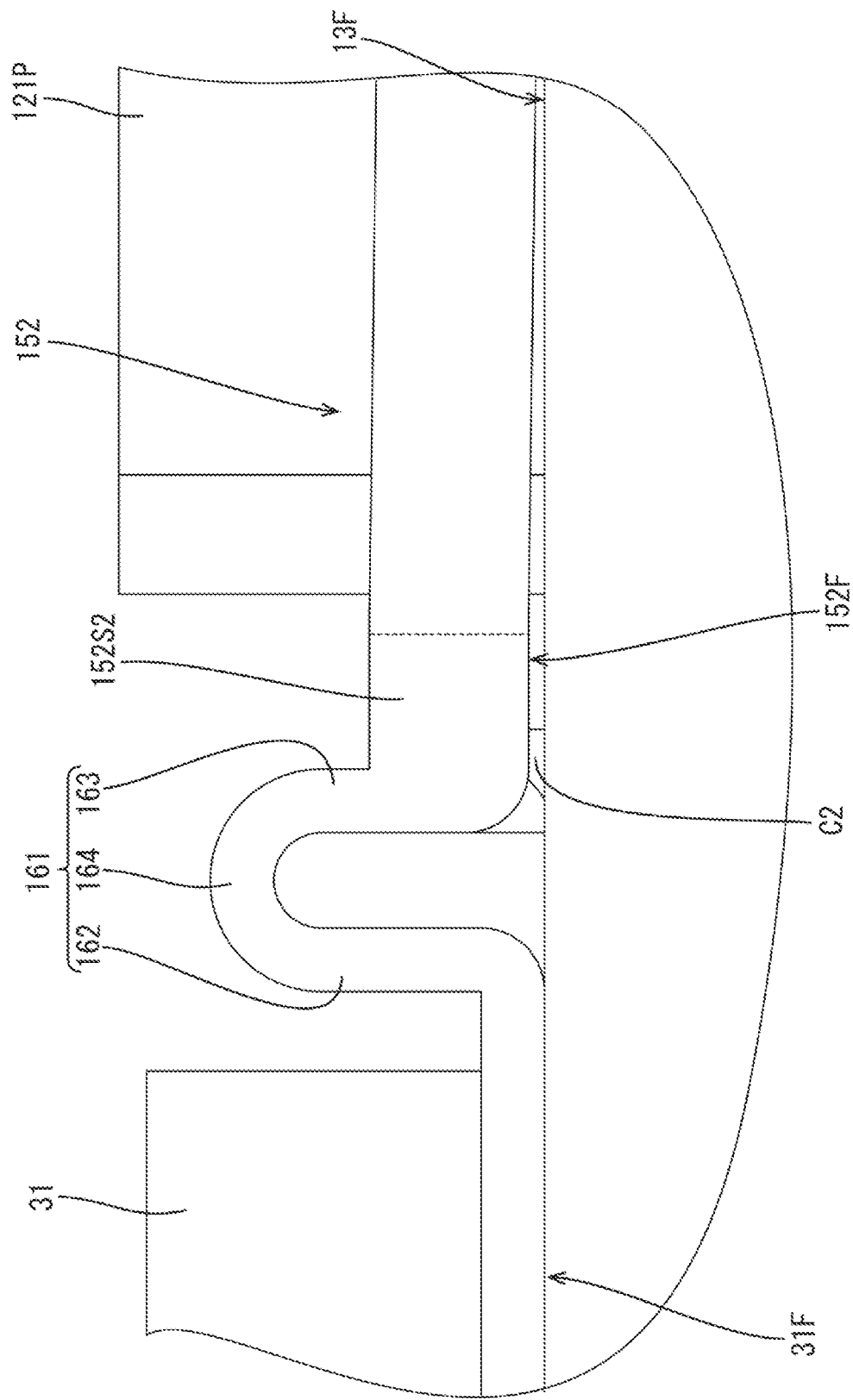
FIG. 17 is a magnified view of a portion in circle R2 in FIG. 15.

As illustrated in FIG. 15, each adjusting portion 161 is a plate spring shaped portion that is curved in a U-shape to protrude toward an opposite side from the electrode disposing surface 13F when the temperature sensor 130 is mounted on the battery cell 110. As illustrated in FIG. 17, a pair of linear sections of the U-shape of each of the adjusting protrusions 161 is a pair of changing portions (a first position changing portion 162, a second position changing portion 163). The changing portions change their positions toward each other and away from each other. An end of the first position changing portion 162 and an end of the second position changing portion 163 are coupled with a connecting portion 164 in an arch shape. One of ends of each adjusting portion 161 (an end of the first position changing portion 162 on an opposite side from the connecting portion 164) is connected with the corresponding extending portion 56. The other ends of each adjusting portion 161 (an end of the second position changing portion 163 on an opposite side from the connecting portion 164) is connected with an edge of the short frame portion 152S2 on an opposite side from the battery opposed surface 152F.

As illustrated in FIGS. 15 and 17, when the temperature sensor 130 is mounted on the battery cell 110, the temperature sensing portion 31 is disposed with an entire are of the temperature sensing surface 31F in close contact with the electrode disposing surface 13F. The short frame portion 152S2 is disposed with a clearance C2 between the short frame portion 152S2 and the electrode disposing surface 13F. The locking frame 152 is sloped to become closer to the electrode disposing surface 13F as a distance from the temperature sensing portion 31 increases.

Before the temperature sensor 130 is mounted on the battery cell 110 (in a state in FIG. 25), the locking frame 152 is sloped relative to the temperature sensing surface 31F more than the locking frame 152 after the temperature sensor 130 is mounted on the battery cell 110 (in a state in FIG. 15).

Before the temperature sensor 130 is mounted on the battery cell 110, an edge 152E of the short frame portion 152S1 on a battery opposed surface 152F side is located within an extended plate F3 extended from the temperature sensing surface 31F. Distance D3 between the extended plane F3 and the contact surface 158F is greater than distance D4 between the holding wall 127 and the electrode disposing surface 13F (see FIGS. 18 and 25).

To mount the temperature sensor 130 on the battery cell 110, the temperature sensor 130 is disposed on the electrode disposing surface 13F with the temperature sensing surface 31F facing the electrode disposing surface 13F and the locking frame 152 surrounding the insulator 121P. Through pushing the locking frame 152 in this state toward the electrode disposing surface 13F, the locking protrusion 154 slides over the first short wall 122S1 of the body 122 and the locking arm 153 warps outward.

When the locking frame 152 is further pushed, as illustrated in FIGS. 16 and 19, the locking protrusion 154 is inserted into the locking recess 123' and the locking arm 153 restores its original shape. As illustrated in FIGS. 16 and 18, the locking protrusion 158 slides over the holding wall 127 and enters into a gap between the holding wall 127 and the electrode disposing surface 13F. With the locking protrusion 154 locked to the locking protrusion receiving surface 124 and the locking protrusion 158 locked to the holding wall 127, the locking frame 152 is attached to the insulator 121P and held in this position. In this condition, as illustrated in FIG. 14, with the distal ends of the positioning ribs 126 inserted in the positioning recesses 155, respectively, the temperature sensor 130 is positioned and restricted from rotating along the outer periphery of the body 122.

As described above, distance D3 between the extended plane F3 and the contact surface 158F is greater than distance D4 between the holding wall 127 and the electrode disposing surface 13F. Therefore, the holding wall 127 presses the locking protrusion 158 toward the electrode disposing surface 13F. Namely, the holding wall 127 presses the short frame portion 152S2 toward the electrode disposing surface 13F. The slope of the locking frame 152 of the temperature sensor 130 becomes gentler in comparison to the locking frame 152 before the temperature sensor 130 is mounted on the battery cell 110. The adjusting portions 161 deform to spread (such that the first position changing portion 162 and the second position changing portion 163 are away from each other). The temperature sensing surface 31F is pressed against the electrode disposing surface 13F. With the temperature sensing surface 31F in close contact with the electrode disposing surface 13F, the proper accuracy of the temperature measurement is obtained. Furthermore, with the locking frame 152 and the adjusting portions 161 that deform by the amounts corresponding to the size tolerance of the battery cell 110, the size tolerance of the battery cell 110 can be compensated.

As described above, the sensor mounting structure according to this embodiment is the structure for mounting the temperature sensor 130 on the battery cell 110. The battery cell 110 includes the electrode terminal 14P, a battery case 111, and the insulator 121P. The battery case 111 includes the cover plate 13 that includes the outer surface configured as the electrode disposing surface 13F. The insulator 121P is mounted on the cover plate 13 to insulate the electrode terminal 14P from the cover plate 13 and hold the electrode terminal 14P. The temperature sensor 130 includes the temperature sensing portion 31 and the attachment portion 151. The temperature sensing portion 31 holds the temperature sensing component 41 and includes the temperature sensing surface 31F that contacts the electrode disposing surface 13F. The attachment portion 151 includes the locking frame 152 locked to the insulator 121P. The attachment portion 151 holds the temperature sensing component 41 in close contact with the electrode disposing surface 13F.

According to the configuration, the locking frame 152 of the temperature sensor 130 is locked to the insulator 121P using the insulator included in the battery cell 110. In comparison to the conventional configuration in which the thermistor is mounted on the battery via the baseplate, the overall sensor mounting structure can be simplified because the baseplate is not used.

Because the baseplate is not used, the size tolerance is less likely to affect. Therefore, a spring structure for holding the temperature sensing surface 31F in close contact with the electrode disposing surface 13F can be simplified.

For the above reasons, the proper accuracy of the temperature measurement is obtained with the simplified structure of mounting the temperature sensor 130.

Each adjusting portion 161 includes the first position changing portion 162 that extends from the temperature sensing portion 31 and a second position changing portion 163 that extends from the locking frame 152 and changes its position toward and away from the first position changing portion 162. The locking frame 152 is sloped to become closer to the electrode disposing surface 13F as the distance from the temperature sensing portion 31 increases. The insulator 121P includes the holding wall 127 that presses the locking frame 152 toward the electrode disposing surface 13F.

According to the configuration, with the locking frame 152 pressed toward the electrode disposing surface 13F by the holding wall 127, the slope of the locking frame 152 of the temperature sensor 130 becomes gentler. The adjusting portions 161 deform to spread and the temperature sensing surface 31F is pressed against the electrode disposing surface 13F. With the simple spring structure, the temperature sensing surface 31F is in close contact with the electrode disposing surface 13F and the proper accuracy of the temperature measurement is obtained.

OTHER EMBODIMENTS

The technology described herein is not limited to the embodiments, which have been described using the foregoing descriptions and the drawings. For example, various embodiments described below are also within the technical scope of the technology described herein.

(1) In the above embodiments, the temperature sensing component 41 is the thermistor. However, the temperature sensing component is not limited to the thermistor. Any types of temperature sensing components may be selected as appropriate.

(2) In the first embodiment, the locking arms 54 included in the attachment portion 51 have the configurations to be locked to the insulator 21P. In the second embodiment, the locking frame 152 included in the attachment portion 151 has the configuration to be locked to the insulator 121P. However, the locking mechanism between the locking portion of the temperature sensor and the insulator is not limited to those embodiments. A locking portion of a temperature sensor may be locked to an insulator through a known locking mechanism.

(3) In the above embodiments, the adjusting portions 61 and 161 are formed in the U shapes. However, the shapes of the adjusting portions are not limited to the above embodiments. For example, they may be formed in V shapes such that the first position changing portions are directly connected with the second position changing portions without the connecting portions.

(4) In the above embodiments, the locking arms 54 and the locking frame 152 are configured as the sloped portions. However, the sloped portions may be provided separately from the locking portions.

LIST OF REFERENCE NUMERALS 10, 110: Battery cell (Electric storage component)
11: Battery case (Case)
13: Cover plate (Case wall)
13F: Electrode disposing surface
14P: Electrode terminal
21P, 121P: Insulator (Insulating component)
27: Holding wall (Holding portion)
30, 130: Temperature sensor
31: Temperature sensing portion
31F: Temperature sensing surface
41: Temperature sensing component
51: Attachment portion (Spring portion)
54: Locking arm (Locking portion, sloped portion)
61: Adjusting portion
62: First position changing portion
63: Second position changing portion
151: Attachment portion (Spring portion)
152: Locking frame (Locking portion, sloped portion)
161: Adjusting portion

The invention claimed is:

1. A sensor mounting structure comprising:
an insulator attached to a wall of a case of an electric storage component to hold an electrode terminal projecting from the case and insulating the electrode terminal from the case; and
a temperature sensor comprising:
a temperature sensing portion holding a temperature sensing component and including a temperature sensing surface contacting the wall of the case;
a locking portion locked to the insulator; and
a spring portion pressing the temperature sensing portion to hold the temperature sensing surface in close contact with the wall of the case, and
the spring portion comprises:
an extending portion that extends from the temperature sensing portion and along edges of the temperature sensing surface; and
an adjustment portion that extends from the extending portion;

wherein, in a state in which the sensor mounting structure is unmounted, the temperature sensing surface is inclined downward from a position at which the extending portion and the adjustment portion are joined to each other.

2. The sensor mounting structure according to claim 1, wherein
- the spring portion comprises:
  - the adjustment portion including a first position changing portion extending from the temperature sensing portion and a second portion changing portion configured to change a position thereof toward and away from the first position changing portion; and
  - a sloped portion extending from the second position changing portion and sloped to become closer to the wall of the case as a distance from the temperature sensing portion increases, and
- the insulating member comprises a holding portion pressing the sloped portion toward the wall of the case.

3. The sensor mounting structure according to claim 1, wherein the adjustment portion comprises a u-shape protruding in a direction upward from the temperature sensing surface.

* * * * *